United States Patent
Sharma

(10) Patent No.: US 10,768,921 B2
(45) Date of Patent: Sep. 8, 2020

(54) METHODS AND APPARATUS FOR PROVIDING OVER-THE-AIR UPDATES TO INTERNET-OF-THINGS SENSOR NODES

(71) Applicant: Intel Corporation, Santa Clara, CA (US)

(72) Inventor: Dhaval Vinayak Sharma, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 15/676,283

(22) Filed: Aug. 14, 2017

(65) Prior Publication Data
US 2019/0042227 A1 Feb. 7, 2019

Related U.S. Application Data

(60) Provisional application No. 62/497,300, filed on Aug. 2, 2017.

(51) Int. Cl.
*G06F 9/445* (2018.01)
*B64C 39/02* (2006.01)
(Continued)

(52) U.S. Cl.
CPC .............. *G06F 8/65* (2013.01); *B64C 39/02* (2013.01); *B64C 39/024* (2013.01);
(Continued)

(58) Field of Classification Search
CPC ......... G06F 8/65; B64C 39/02; B64C 39/024; B64C 2201/122; B64C 2201/123;
(Continued)

(56) References Cited

U.S. PATENT DOCUMENTS 8,209,677 B2 * 6/2012 Shintani et al. ......... H04B 3/54
717/172
9,836,296 B2 12/2017 Vandikas et al.
(Continued)

FOREIGN PATENT DOCUMENTS

| KR | 20170059210 | 5/2017 |
| WO | 2015073687 | 5/2015 |
| WO | 2016131626 | 8/2016 |

OTHER PUBLICATIONS

International Electrotechnical Commission, "Internet of Things: Wireless Sensor Networks," White Paper, 2014, 78 pages.
(Continued)

*Primary Examiner* — Wei Y Zhen
*Assistant Examiner* — Mohammed N Huda
(74) *Attorney, Agent, or Firm* — Hanley, Flight & Zimmerman, LLC

(57) ABSTRACT

Example methods and apparatus for providing over-the-air-updates to IoT sensor nodes are disclosed herein. An example unmanned aerial vehicle includes an update deliverer to access a firmware update to be delivered to a sensor node in a network. The sensor node is coupled to an object. The example unmanned aerial vehicle includes a camera to generate image data and an identifier to identify the object based on the image data. The update deliverer is to deliver the firmware update to the sensor node based on identification of the object.

18 Claims, 8 Drawing Sheets

(51) Int. Cl.
- *G06K 9/00* (2006.01)
- *H04L 29/08* (2006.01)
- *G06F 8/65* (2018.01)
- *H04W 4/50* (2018.01)
- *H04W 4/70* (2018.01)
- *H04W 4/40* (2018.01)

(52) U.S. Cl.
CPC ....... *G06K 9/0063* (2013.01); *G06K 9/00637* (2013.01); *H04L 67/34* (2013.01); *H04W 4/50* (2018.02); *B64C 2201/122* (2013.01); *B64C 2201/127* (2013.01); *H04L 67/12* (2013.01); *H04W 4/40* (2018.02); *H04W 4/70* (2018.02)

(58) Field of Classification Search
CPC ........ B64C 2201/127; B64C 2201/128; G06K 9/0063; G06K 9/00637; H04L 67/12; H04L 67/34; H04W 4/40; H04W 4/50; H04W 4/70
USPC .......................................................... 717/172
See application file for complete search history.

(56) References Cited

U.S. PATENT DOCUMENTS

| | | | |
|---|---|---|---|
| 2014/0022051 A1* | 1/2014 | Levien et al. | B64C 39/02 340/5.2 |
| 2016/0364223 A1 | 12/2016 | Vandikas et al. | |
| 2017/0111950 A1 | 4/2017 | Muelder | |
| 2018/0024828 A1* | 1/2018 | Nogueira-Nine | G06F 8/65 717/173 |

OTHER PUBLICATIONS

Texas Instruments, "CC1350 SimpleLink Ultra-Low Power Dual-Band Wireless MCU," SWRS183A, Nov. 2016, 61 pages.

Texas Instruments, "CC1350 SimpleLink Ultra-Low Power Dual Band Wireless Microcontroller," retrieved Jun. 9, 2017 from http://www.ti.com/product/CC1350/description, 7 pages.

Patent Cooperation Treaty, "International Search Report," issued in connection with International Application No. PCT/US2018/040070, dated Oct. 29, 2018, 3 pages.

Patent Cooperation Treaty, "Written Opinion of the International Searching Authority," issued in connection with International Application No. PCT/US2018/040070, dated Oct. 29, 2018, 10 pages.

* cited by examiner

METHODS AND APPARATUS FOR PROVIDING OVER-THE-AIR UPDATES TO INTERNET-OF-THINGS SENSOR NODES

RELATED APPLICATION

This patent claims priority to U.S. Provisional Patent Application Ser. No. 62/497,300, filed on Aug. 2, 2017, under 35 U.S.C. § 119(e).

FIELD OF THE DISCLOSURE

This disclosure relates generally to sensor nodes in an Internet-of-Things network, and, more particularly, to methods and apparatus for providing over-the-air updates to internet-of-things sensor nodes.

BACKGROUND

The internet-of-things (IoT) includes a network of communicatively coupled objects (e.g., devices) having sensor nodes that collect data and wirelessly transmit the data over the network for analysis by, for example, a cloud-based device. The sensor nodes may operate in a low power mode to minimize power consumption during, for example, data transmission over long distances.

The sensor nodes include firmware that may require periodic updates. Over-the-air updates enable firmware updates to be delivered to devices in an IoT network that may be difficult to reach with a cable connection. However, wirelessly delivering a firmware update to a sensor node operating in a low power mode in an IoT network can be inefficient due to slow wireless connectivity speeds.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
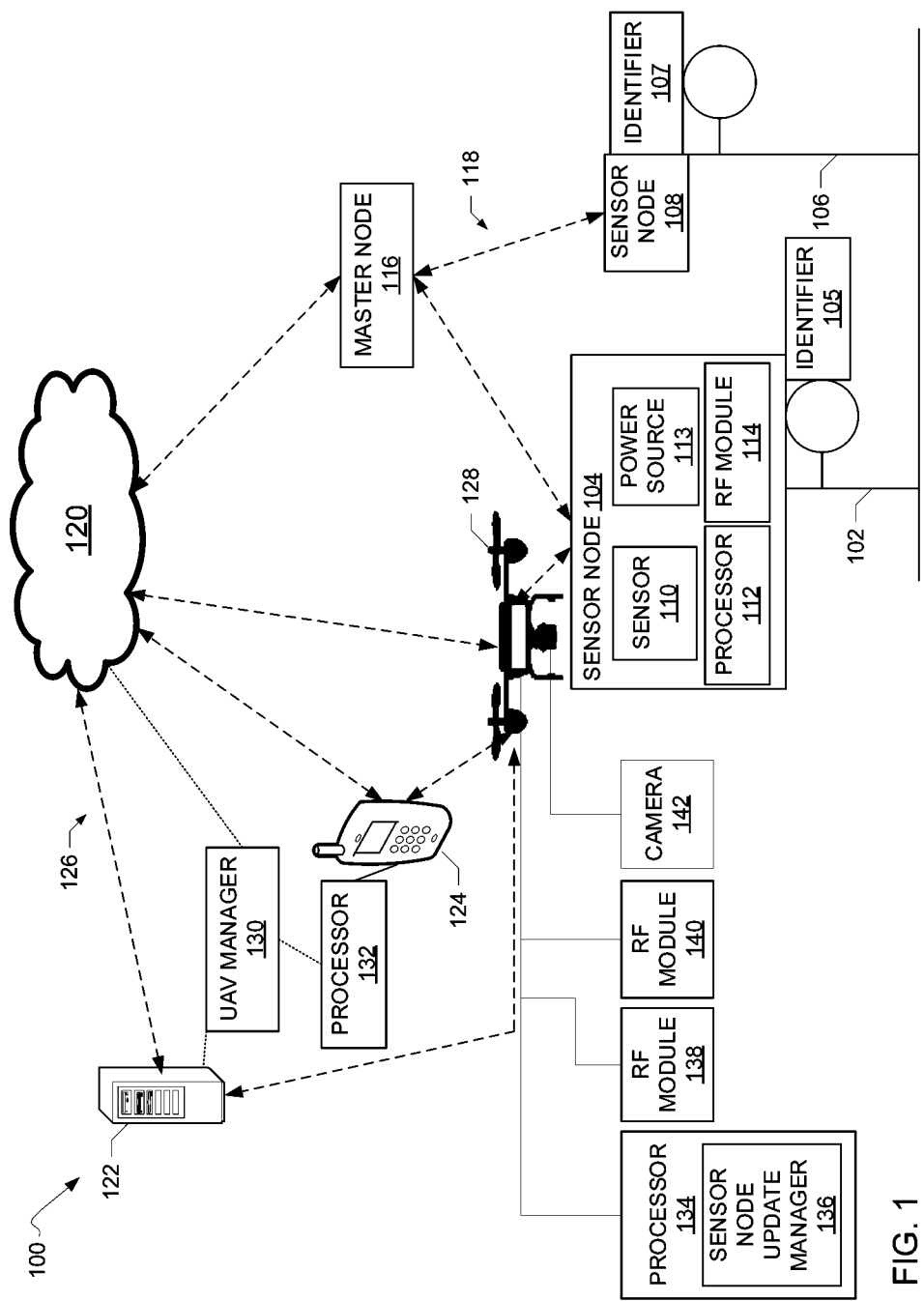
FIG. 1 illustrates an example system including an IoT network having one or more sensor nodes and an unmanned aerial vehicle (UAV) for delivering updates to the sensor nodes in accordance with the teachings disclosed herein.

The Internet-of-Things (IoT) includes a network of objects embedded with sensors that enable the objects to be connected to the Internet and to transfer data collected by the sensors to the Internet for analysis, to receive instructions, etc. Example objects of an IoT network can include user devices, such as smartphones, medical devices implanted in humans, and/or industrial equipment, such as intelligent motors. The objects include sensor nodes coupled thereto (e.g., embedded with) having sensors to collect data. For example, a sensor of a street light can collect data about luminance and/or duration of time that the light is illuminated and send the data over the network to a cloud-based device for analysis. As another example, the street light can include sensors that collect temperature and humidity data about the environment in which the street light is located. In some examples, the sensor nodes in an IoT network can be coupled to a master node, which can transmit data received from the sensor nodes to, for example, a cloud-based device.

A sensor node can include hardware such a power source, a controller (e.g., a microcontroller), a sensor, and a wireless transceiver. The transceiver transmits data collected by the sensor to the cloud-based device in an IoT network (e.g., via the master node) and can receive instructions from, for example, another device in the IoT network (e.g., a user device) via the cloud and/or the master node. Example sensor nodes in an IoT network include long range, low power sensor nodes. Such example sensor nodes are capable of transmitting data over long distances (e.g., via a mesh network, a low speed wireless network) while minimizing energy consumption to, for example, improve battery life. However, such sensor nodes often achieve transmission over long ranges by reducing the data rate at which the data is transmitted (e.g., a wireless speed of under 1 kbps). For example, the nodes may transmit data over sub-1 GHz frequency bands. As another example, the nodes may transmit data via LoRaWAN™, a low power wide area network that is optimized for data transmission from a node to a server but has reduced bandwidth availability for data transmission from the server to the node (e.g., eight times less bandwidth availability).

In some examples, the sensor nodes include firmware that may require updates to maintain performance, to install additional features, and/or to fix bugs. In an IoT network, the sensor nodes can be located in an environment where establishing a wired connection to update the firmware is not practical. Further, there may be multiple sensor nodes (e.g., hundreds) that need to be updated. Firmware-over-the-air (FOTA) updates can be used to deliver firmware updates without requiring a wired connection. In some known examples, the master node can deliver a FOTA update across the network of sensor nodes via a low speed wireless network or a mesh network connecting the sensor nodes and the master node. However, updating the firmware at low data speeds across a plurality of sensor nodes is time-consuming and inefficient. Further, large amounts of data transferred during the FOTA update can affect node stability in the network.

Some microcontrollers include dual band wireless radios that can switch between different wireless speed capabilities. When used in a sensor node in an IoT network, such example microcontrollers provide for communication at low speeds via wireless communication in, for example, the sub-1 GHz frequency band while, for example, a sensor of the sensor node is collecting sensor data and/or the sensor data is being transmitted over long ranges to other sensor nodes, the master node, etc. (e.g., via a mesh network). Such example microcontrollers also support communication at higher speeds via wireless communication over, for example, the 2.4 GHz frequency band or via Bluetooth low energy (BLE). However, although data can be exchanged at higher speeds via the 2.4 GHz WiFi frequency band or BLE using a dual-band microcontroller, there are restrictions with respect to distances at which the high speed data transmissions can occur. For example, in the context of an IoT network, a sensor node containing a dual-band microcontroller may need to be in proximity (e.g., 10-30 meters) of a master node to receive a firmware update from the master node over the 2.4 GHz WiFi frequency band or via BLE. Such proximity restrictions may not be practical in an IoT network including many sensor nodes deposited over a large area (e.g., a city, a forest). Although the sensor nodes could be manually updated via the 2.4 GHz WiFi frequency band or BLE by establishing connections with each sensor node at the required proximity to initiate the updates (e.g., 10 m), such updates would be time consuming and, in some examples, impractical based on the number of sensor nodes to be updated across the IoT network.

Unmanned aerial vehicles (UAVs) such as drones (e.g., rotary drones) can hover around a particular area for a particular period of time. Some UAVs include wireless connectivity features such as WiFi (e.g., over the 2.4 GHz frequency band) and/or Bluetooth connections. Thus, some UAVs can establish wireless communication with other devices to provide for high speed data transmission (e.g., as compared to communication over the sub-1 GHz frequency band). Some example UAVs include cameras that generate image data and controllers (e.g., processors) for storing and/or analyzing the image data and/or other data.

Examples systems and methods disclosed herein deliver firmware update(s) to sensor node(s) in an IoT network via UAV(s) that establish wireless connections with the sensor node(s). Some examples include a sensor node having a dual-band wireless microcontroller that provides for long-range communication at lower frequencies (e.g., over the sub-1 GHz frequency band via a mesh network or a low speed wireless network) as well as short-range, higher speed communication at higher frequencies (e.g., over the 2.4 GHz frequency band and/or 5 GHz frequency band; via WiFi, BLE). In some examples, the sensor node operates in a first wireless mode, such as a low power wireless mode (e.g., sub-1 GHz), to collect sensor data and to transmit the sensor data to, for example, a master node in the IoT network. When the sensor node is to be updated, a UAV flies to a location in proximity of the sensor node and sends an instruction to the dual-band wireless microcontroller of the sensor node to switch a second wireless mode, such as a high speed wireless mode (e.g., 2.4 GHz, BLE). Example UAVs disclosed herein includes a 2.4 GHz transceiver (and/or other high-speed wireless transceiver) that connects with the sensor node when the sensor node is in the high speed wireless mode to deliver the firmware update to the sensor node at faster data rates than would be achieved by updating the sensor node in the low power wireless mode. In some examples, the UAV hovers around the sensor node for at least a duration of time required to update the sensor node.

Example UAVs disclosed herein include means to recognize an IoT object in the IoT network having a sensor node that is to be updated. In some examples, the UAV recognizes the sensor node to be updated based on image data collected by the UAV during flight and an identifier associated with the sensor node. In some examples, the UAV additionally, or alternatively, recognizes the sensor node to be updated based on the strength of signals emitted by the sensor node, which informs the UAV that the UAV is in proximity to the sensor node to be updated. Thus, in examples disclosed herein, the sensor nodes of the IoT network can be efficiently updated via FOTA updates delivered via one or more UAVs.

In some examples disclosed herein, the UAV receives instructions from a user device associated with an operator with respect to the sensor node(s) to be updated, a route for the UAV to follow to reach the sensor node(s), and the update to be delivered. In some examples, the instructions are automatically generated by a device in the IoT network (e.g., a user device, a server, a cloud-based device). In some examples, the UAV transmits messages to one or more devices in the IoT network and/or the operator during installation of the FOTA update at the sensor node. The message(s) can include the status of the update at the sensor node, a confirmation that the update was successful, etc. In examples where the FOTA update is successful, the UAV instructs the dual-band wireless microcontroller of the sensor node to switch back to the low power wireless mode for continued collection and/or transmission of sensor data across the IoT network. Thus, in examples disclosed herein, the sensor nodes of the IoT network can be efficiently updated via FOTA updates delivered via one or more UAVs. In examples disclosed herein, the UAVs serve as an effective means for addressing the proximity requirements associated with the high speed wireless mode to update the sensor nodes.

FIG. 1 illustrates an example system 100 constructed in accordance with the teaching of this disclosure for delivering firmware-over-the-air (FOTA) updates to sensor nodes associated with objects in an IoT network. For illustrative purposes, the IoT network will be discussed in the context of street lights including sensors that collect data about environment in which the street lights are located, such as temperature and humidity. However, the examples disclosed herein can be utilized in any IoT network and/or with other IoT objects (e.g., user devices, buildings). As such, the discussion of delivering firmware updates to sensor nodes associated with street lights is for illustrative purposes only and does not limit this disclosure to a particular object in an IoT network and/or a particular IoT network. Further, although the discussion herein is in the context of delivering firmware updates, other types of software could be delivered to the sensor nodes and/or the IoT objects in accordance with the teachings disclosed herein.

The example system 100 includes a first example street light 102 having a first example sensor node 104 coupled thereto (e.g., embedded with) and a second example street light 106 having a second example sensor node 108 coupled thereto. The example system 100 can include additional sensor nodes associated with each street light 102, 106 and/or additional street lights including sensor nodes. The example system 100 of FIG. 1 can also include additional IoT objects (e.g., stop signs, water meters, buildings) including sensor nodes.

In the example of FIG. 1, the first street light 102 includes a first example identifier 105 and the second street light 106 includes a second example identifier 107. The identifiers 105, 107 can include markings (e.g., a number, a bar code, a graphical design) that are used to distinguish the street lights 102, 106 (and, thus, the corresponding sensor nodes 104, 108) from one another. As disclosed herein, the identifiers 105, 107 are used to identify the respective street light 102, 106 including the sensor node 104, 108 that is to receive the firmware update. For ease of discussion, the delivery of a firmware update to a sensor node may be discussed in connection with the first sensor node 104 with understanding that the same or similar description applies to the second sensor node 108.

In the example of FIG. 1, the first sensor node 104 includes an example sensor 110 to collect data, such as temperature data for the environment in which the street light 102 is located. The first sensor node 104 includes a processor 112 (e.g., a microcontroller). The sensor 110 transmits sensor data (e.g., temperature data) to the processor 112 for storage, processing, and/or transmission to another node in the example system 100. The processor 112 controls the sensor 110 with respect to the data that is collected, the sampling rate, etc. The processor 112 can perform one or more operations on the sensor signal data such as filtering the raw signal data, removing noise from the signal data, converting the signal data from analog data to digital data, and/or analyzing the data. The first sensor node 104 of FIG. 1 also includes an example power source 113 such as a battery.

The first sensor node 104 includes an example dual-band radio frequency (RF) module 114 (e.g., an RF transceiver) in communication with the processor 112. In some examples, the dual-band RF module 114 is implemented by the processor 112 (e.g., a microcontroller). In the example of FIG. 1, the dual-band RF module 114 can switch between a first wireless mode, such as a low power wireless mode (e.g., communication in the sub-1 GHz band), and a second wireless mode, such as a high speed wireless mode (e.g., communication in the 2.4 GHz band and/or 5 GHz band). In some examples, the RF module 114 includes two separate RF modules corresponding to low power wireless mode and the high speed wireless mode (e.g., a first sub-1 GHz RF module and a second 2.4 GHz RF module).

The RF module 114 transmits data generated by the sensor 110 to an example master node 116 in communication (e.g., wireless communication) with the first sensor node 104 based on one or more instructions generated by the processor 112. In some examples, the RF module 114 communicates with the master node 116 in the low power wireless mode to reduce power consumption by the first sensor node 104. In some such examples, the first sensor node 104 communicates with the master node 116 via the RF module 114 using one or more communication protocols such as Zigbee™, SigFox™, etc. In some examples, the processor 112 of the first sensor node 104 includes two or more processors. In some such examples, at least one of the processors is dedicated to controlling the sensor 110 and/or processing the data received from the sensor 110, and another of the processors controls transmission of the data to, for example, the master node 116 via the RF module 114.

In the example of FIG. 1, the example master node 116 of FIG. 1 is communicatively coupled to the second sensor node 108. Thus, the master node 116, the first sensor node 104, and the second sensor node 108 form a local sensor network 118 (e.g., a mesh network, a low speed wireless network). The master node 116 can include, for example, a database to store data received from the first and/or second sensor nodes 104, 108 and a processor to send instructions to the first and/or second sensor nodes 104, 108.

In the example of FIG. 1, the master node 116 is communicatively coupled (e.g., via wireless connection(s)) to one or more example cloud-based devices 120 (e.g., one or more virtual machines, servers, and/or processors). In the example of FIG. 1, the cloud-based device(s) 120 communicate with one or more other objects or devices. For example, as illustrated in FIG. 1, the cloud-based device 120 can communicate with one or more of a local server 122 or a user device 124 (e.g., a smartphone, a personal computer, a tablet) via, for example, WiFi. In the example of FIG. 1, the street lights 102, 106 including the respective sensor nodes 104, 108, the master node 116, the local server 122, the user device 124, and the cloud-based device(s) 120 form an example IoT network 126.

In the example of FIG. 1, the first sensor node 104 intermittently (e.g., periodically and/or aperiodically, based on one or more events, etc.) requires firmware updates for maintenance purposes and/or to install new features to be implemented by, for example, the processor 112. As disclosed herein, the first sensor node 104 operates in the low power wireless mode by communicating with the master node 116 and/or the second sensor node 108 via the RF module 114 over, for example, the sub-1 GHz frequency band. However, as also disclosed herein, delivering an FOTA update to the first sensor node 104 via the master node 116 when the first sensor node 104 is operating in the low power wireless mode can be time-consuming and, in some instances, can destabilize the local sensor network 118 due to the amount of data associated with the firmware update to be transferred. Also, although the dual-band RF module 114 can switch to the high speed wireless mode to enable communication over, for example, the 2.4 GHz WiFi frequency band or BLE, in some examples, the first sensor node 104 is located at a distance from the master node 116 that exceeds the distance range over which the high speed wireless mode is effective (e.g., greater than 10-20 m from the master node 116).

In the example of FIG. 1, an example unmanned aerial vehicle (UAV) 128 is deployed to provide an FOTA update at the first sensor node 104. The UAV 128 of FIG. 1 receives an instruction from an example UAV manager 130 to fly to the first sensor node 104 and deliver the firmware update to the first sensor node 104. In the illustrated example, the UAV manager 130 is implemented by software executed on a processor 132 of the user device 124, a processor of the local server 122, and/or by the cloud-based device(s) 120. In some examples, one or more the components of the example UAV manager 130 are implemented by the processor 132 of the user device 124 and one or more other components are implemented by the local server 122 and/or the cloud-based device(s) 120. The UAV manager 130 communicates with the UAV 128 via one or more wired and/or wireless connections. As illustrated in FIG. 1, the communication between the UAV manager 130 and the UAV 128 can be direct (e.g., the processor 132 of the user device 124 is in direct communication with the UAV 128) or indirect (e.g., the local server 122 communicates with the UAV 128 via the cloud-computing environment).

The firmware update can be generated at, for example, the user device 124 and stored by the UAV manager 130. The UAV manager 130 transmits the firmware update to the UAV 128 for storage on the UAV 128 (e.g., via wired and/or wireless connection(s)). Thus, during flight, the UAV 128 carries the firmware update.

In the example system 100 of FIG. 1, the UAV manager 130 generates one or more instructions for the UAV 128 to deliver the firmware update to the first sensor node 104. For example, the UAV manager 130 instructs the UAV 128 to deliver the firmware update based on user input(s) received at the user device 124 that indicate that the firmware update should be initiated. In other examples, the UAV manager 130 automatically instructs the UAV 128 to deliver the firmware update based on a sensor node update schedule implemented by, for example, the local server 122 and/or the cloud-based device(s) 120.

The example UAV manager 130 of FIG. 1 generates a map or waypoint route for the UAV 128 to reach IoT objects in the IoT network, including sensor nodes to be updated (e.g., the first street light 102 including first sensor node 104), and transmits the map to the UAV 128. The IoT object map generated by the UAV manager 130 sets forth a path for the UAV 128 to follow to reach one or more waypoints in the IoT network 126, including the first street light 102 and/or the second street light 106 and, thus, the corresponding sensor nodes 104, 108. In some examples, the IoT map is generated by the UAV 128 based on user input(s) received via the processor 132 of the user device 124. The user inputs can include, for example, a location of the IoT object including the sensor node to be updated (e.g., a location of the first street light 102), a preferred route for flying for the UAV 128 (e.g., based on time constraints, known obstacles, wind conditions), the identifier(s) associated with the IoT object(s) including the sensor node(s) to be updated (e.g., the identifier 105 of first street light 102). In other examples, the UAV manager 130 (e.g., at the local server 122 and/or the cloud-based device(s) 120) automatically generates the IoT object map based on data previously stored by the UAV manager 130 with respect to, for example, the location of the first street light 102, the identifier 105 of the first street light 102, etc.

The example UAV 128 includes an example processor 134. The processor 134 of the UAV 128 executes software to implement an example sensor node update manager 136 to deliver firmware update(s) to one or more sensor nodes in the IoT network 126 (e.g., the first sensor node 104, the second sensor node 108). As disclosed herein, the sensor node update manager 136 generates instruction(s) for the sensor node(s) to install the firmware update(s) at the sensor node(s).

The example UAV 128 includes an example first (e.g., high speed) RF module 138 that provides for WiFi or BLE communication over a high frequency (e.g., 2.4 GHz, 5 GHz, etc.). The example UAV 128 includes an example second (e.g., low speed) RF module 140 that provides for long range communication over, for example, a low frequency (e.g., sub-1 GHz) and/or via communication protocols such as Sigfox™, Zigbee™, etc.

The example UAV 128 includes one or more example camera(s) 142 coupled thereto. The example camera 142 of FIG. 1 includes one or more sensors (e.g., a red-green-blue (RGB) sensor) to detect color, light, etc. and to generate image data (e.g., pixels). The example camera(s) 142 of FIG. 1 also include at least one depth sensor to measure a distance of the camera(s) 142 from, for example, the ground and/or an object in the IoT network 126 (e.g., the first street light 102) and to generate depth data. In some examples, the depth sensor(s) measure depth via projection of a near-infrared light via one or more infrared laser projectors of the camera(s) 142 to generate 3-D images. In the example of FIG. 1, the camera(s) 142 are implemented by RealSense™ cameras that are commercially available from Intel™ Corporation.

In the example of FIG. 1, the UAV manager 130 transmits the firmware update and/or the IoT object map to the sensor node update manager 136. The sensor node update manager 136 instructs the UAV 128 to fly to an area proximate to, for example, the first street light 102 based on the map (e.g., via instructions executed by autopilot software installed on the UAV 128). When the UAV 128 is within a threshold distance of the first street light 102 (e.g., based on the map), the camera(s) 142 generate image data with respect to the environment in which the UAV 128 is flying. In some examples, camera(s) 142 generate depth data with respect to a depth of the UAV 128 from one or more objects in the IoT network 126.

The sensor node update manager 136 processes the image data and/or the depth data generated by the camera(s) 142 to determine if the UAV 128 has arrived at the first street light 102. In particular, the sensor node update manager 136 applies one or more object recognition rules to determine if the UAV 128 has arrived at the first street light 102 based on the identifier 105 of the first street light 102 represented in the image data generated by the camera(s) 142. In the example of FIG. 1, when the sensor node update manager 136 determines that the UAV 128 is proximate to the first street light 102, the sensor node update manager 136 generates, based on the image data and the depth data generated by the camera(s) 142, instructions to position the UAV 128 near the first street light 102 (e.g., closer to) and/or the area of the first street light 102 to which the first sensor node 104 is coupled (e.g., embedded). In some examples, the instructions generated by the sensor node update manager 136 are executed in connection with autopilot software of the UAV 128 to navigate the UAV 128. In some such examples, the UAV 128 hovers around the first sensor node 104 and/or area of the first street light 102 including the first sensor node 104.

As disclosed above, the first sensor node 104 operates in the low power wireless mode as the sensor 110 collects data and the sensor data is transmitted over the local sensor network 118 to the master node 116 (e.g., over the sub-1 GHz frequency band). As also disclosed above, the second RF module 140 of the UAV 128 provides for low frequency communication over, for example, the sub-1 GHz frequency band. Thus, the UAV 128 can communicate with the first sensor node 104 when the first sensor node 104 is operating in the lower power wireless mode via signals transmitted by the second RF module 140. In some examples, the UAV 128 is configured to comply with other network security parameters associated with the first sensor node 104 and/or the local sensor network 118 (e.g., authentication, key exchange) to communicate with the first sensor node 104.

In the example of FIG. 1, when the UAV 128 is positioned proximate to (e.g., hovering near) the first street light 102, the sensor node update manager 136 transmits a message to the processor 112 of the first sensor node 104 via the second RF module 140 including instructions for the dual-band RF module 114 to switch from the low power wireless mode (e.g., communication over the low, sub-1 GHz frequency band) to the high speed wireless mode (e.g., communication over the high, 2.4 GHz frequency band). Based on the instructions from the sensor node update manager 136, the dual-band RF module 114 switches to the high speed wireless mode.

When the dual-band RF module 114 of the first sensor node 104 switches to the high speed wireless mode, sensor node update manager 136 of the UAV 128 establishes point-to-point connectivity with the processor 112 of the first sensor node 104 via the first RF module 138 of the UAV 128. As disclosed herein, the first RF module 138 of the UAV 128 provides for communication over a high frequency band, such as the 2.4 GHz or 5 GHz frequency band. The sensor node update manager 136 delivers the FOTA update to the processor 112 of the first sensor node 104 via the first RF module 138, thereby providing for high speed wireless delivery of the firmware update to the first sensor node.

In some examples, after the FOTA update is delivered to the first sensor node 104, the first sensor node 104 reboots to complete the firmware update and sends a message to the sensor node update manager 136 of the UAV 128 confirming that the FOTA update was successful. In such examples, the first sensor node 104 is still operating in the high speed wireless mode. When the sensor node update manager 136 of the UAV 128 receives the confirmation message from the first sensor node 104, the sensor node update manager 136 sends a message to the processor 112 of the first sensor node 104 including instructions for the dual-band RF module 114 to switch back to the low power wireless mode (e.g., communication over the low, sub-1 GHz frequency band). In some examples, the sensor node update manager 136 sends status message(s) to the UAV manager 130 during the FOTA update and/or after the FOTA update is complete (e.g., via WiFi, Bluetooth). The status messages can inform, for example, a user of the user device 124 about the status of the firmware update at the first sensor node 104.

In some examples, after the firmware update is complete at the first sensor node 104, the sensor node update manager 136 instructs the UAV 128 to fly to another IoT object to deliver an FOTA sensor node update based on the IoT object map (e.g., the second street light 106). In some examples, if there are no other sensor nodes to be updated, the sensor node update manager 136 instructs the UAV 128 to return to a UAV storage base until the UAV 128 is to be deployed again.

Figure 2:
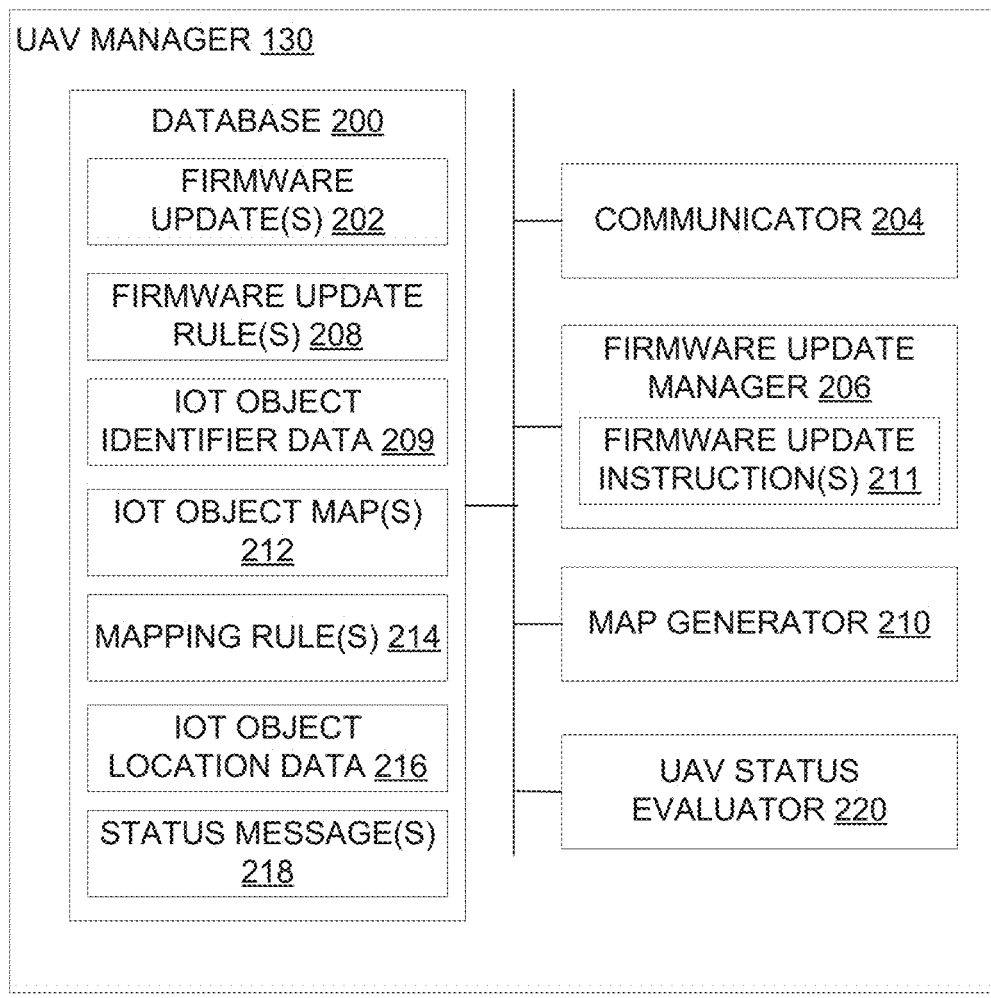
FIG. 2 is a block diagram of an example implementation of the UAV manager of FIG. 1.

FIG. 2 is a block diagram of an example implementation of the UAV manager 130 of FIG. 1. As mentioned above, the example UAV manager 130 is constructed to instruct one or more UAVs (e.g., the UAV 128 of FIG. 1) to deliver a firmware update to one or more sensor nodes (e.g., the first sensor node 104 of FIG. 1) in an IoT network (e.g., the IoT network 126 of FIG. 1). In the example of FIG. 2, the UAV manager 130 is implemented by one or more of the processor 132 of the user device 124, the local server 122, and/or the cloud-based device(s) 120 (e.g., the server(s), processor(s), and/or virtual machine(s) 120 of FIG. 1). In some examples, one or more components of the UAV manager 130 are implemented in a cloud-computing environment and one or more other components of the UAV manager 130 are implemented by the processor 132 of the user device 124 and/or the local server 122. In the example of FIG. 2, the UAV manager 130 is in communication with the example sensor node update manager 136 of the UAV 128 of FIG. 1 (e.g., via WiFi, Bluetooth). In some other examples, one or more components of the UAV manager 130 may be implemented by the processor 134 of the UAV 128 of FIG. 1.

The example UAV manager 130 of FIG. 2 includes an example database 200. In other examples, the database 200 is located external to the UAV manager 130 in a location accessible to the UAV manager 130. As disclosed above, in some examples, the UAV manager 130 receives example firmware update(s) 202 to be installed at the sensor node(s) from one or more processors that were used to create the firmware update(s) 202. The UAV manager 130 transmits firmware update(s) 202 to the sensor node update manager 136 of the UAV 128. The example database 200 includes means for storing the firmware update(s) 202.

The example UAV manager 130 includes an example communicator 204. In the illustrated example, the communicator 204 provides means for communicating with the sensor node update manager 136 of the UAV 128. For example, the communicator 204 transmits the firmware update(s) 202 for storage on the sensor node update manager 136.

The example UAV manager 130 includes an example firmware update manager 206. In the illustrated example, the firmware update manager 206 provides means for identifying the sensor node(s) in an IoT network to receive firmware update(s). In some examples, the firmware update manager 206 provides means for automatically determining whether the sensor node(s) should be updated.

In some examples, the example firmware update manager 206 applies one or more example firmware update rules 208 to determine whether the sensor node(s) 104, 108 should be updated. The firmware update rule(s) 208 can be defined by one or more user inputs. The firmware update rule(s) 208 can include, for example, rule(s) about which sensor node(s) should receive the update(s) 202, a schedule defining when the firmware update(s) 202 should be provided to sensor node(s), how the update(s) 202 should be delivered (e.g., as one update or in two or more batches), etc. In some such examples, the firmware update manager 206 automatically determines which sensor node(s) should be updated based on the rule(s) 208. In other examples, a user defines the sensor node(s) to be updated and the manner in which the update(s) are to be provided via user input(s) received at, for example, the user device 124. In such examples, the user input(s) are processed by the firmware update manager 206 to determine the sensor node(s) to be updated.

Based on the determination of the sensor node(s) to be updated, the firmware update manager 206 generates example IoT object identifier data 209. As disclosed above, each of the objects in the example IoT network 126 includes an identifier, such as the first identifier 105 associated with the first street light 102 and the second identifier 107 associated with the second street light 106. As also disclosed above, the example sensor node update manager 136 determines that the UAV 128 has arrived at the IoT object including the sensor node(s) to be updated based on the identifier associated with that object.

In some examples, the firmware update manager 206 generates the IoT object identifier data 209 based on user input(s) indicating the particular IoT object sensor nodes to be updated. In some examples, the firmware update manager 206 automatically generates the IoT object identifier data 209 based on previously stored identifier data in response to the automatic determination that particular sensor nodes should be updated (e.g., based on the firmware update rule(s) 208).

The IoT object identifier data 209 includes, for example, a mapping of identifiers for one or more objects in the IoT network including sensor node(s) to be updated via the UAV 128 of FIG. 1. In some examples, the IoT object identifier data 209 includes a listing of the identifiers of at least a portion of the IoT object(s) in the IoT network. In such examples, the IoT object identifier data 209 includes flags for the IoT object(s) having the sensor node(s) to be updated. The example database 200 stores the IoT object identifier data 209.

In some examples, the firmware update manager 206 generates example firmware update instruction(s) 211 based on user input(s) and/or the firmware update rule(s) 208. The firmware update instruction(s) 211 are transmitted to the sensor node update manager 136 of the UAV 128 by the communicator 204 based on. The instruction(s) 211 can include, for example, instructions for the UAV 128 to fly to the sensor node(s) at a particular time based on a predefined firmware update delivery schedule, instructions for the firmware update(s) 202 to be delivered in two or more batches, etc.

The example UAV manager 130 includes an example map generator 210. In the illustrated example, the map generator 210 provides means for generating one or more example IoT object maps 212 that define a route for the UAV 128 to follow to reach the IoT object(s) including the sensor node(s) to be updated. In examples where the firmware update manager 206 automatically determines that the sensor node(s) should be updated (e.g., based on the firmware update rule(s) 208), the map generator 210 automatically generates the IoT object map(s) 212. In other examples, the map generator 210 generates the map(s) 212 in response to receiving a user input instructing the map generator 210 to generate the map(s).

The example map generator 210 generates the maps based on example mapping rule(s) 214 and/or example IoT object location data 216 stored in the database 200. In FIG. 2, the mapping rule(s) 214 and the IoT object location data 216 can be defined by user input(s). The mapping rule(s) 214 can include, for example, user preferences for the route(s) to be generated for the UAV(s) 128 to follow based on time, obstacles for the UAV(s) 128 to avoid, weather conditions (e.g., wind), etc. The IoT object location data 216 includes location data about the IoT object(s) with which each sensor node is associated (e.g., the locations of the respective street lights 102, 106), the locations of the respective sensor node(s) relative to IoT object(s) (e.g., the first sensor node 104 is disposed proximate to a portion of the first street light 102 including the light), etc.

The example map generator 210 of FIG. 2 generates the IoT object map(s) 212, which can include one or more waypoints corresponding to each sensor node to be updated. An example IoT object map 212 can include a route for flying from a UAV base to the first street light 102 to update the first sensor node 104, a route for flying from the first street light 102 to the second street light 106 to update the second sensor node 108, a route for flying from the second street light 106 to another IoT object and/or to return to the UAV base, etc. In the example of FIG. 2, the map(s) 212 are stored in the database 200. The map(s) 212 stored in the database 200 can be retrieved by the UAV manager 130 when the sensor node(s) of the IoT object(s) associated with the map(s) 212 require firmware updates (e.g., at a future time) to increase an efficiency of the UAV manager 130 in providing instruction to the UAV 128. In the example of FIG. 2, the communicator 204 transmits the map(s) 212 to the sensor node update manager 136 of the UAV 128.

As disclosed herein, in some examples, the sensor node update manager 136 of the UAV 128 of FIG. 1 generates one or more example status messages 218 during the FOTA update and/or after the FOTA update is complete and transmits (e.g., via WiFi, Bluetooth) the message(s) 218 to the UAV manager 130. The status message(s) 218 can include, for example, messages that the FOTA update(s) are in progress, that the firmware update(s) were successfully installed, whether or not error(s) occurred, etc. The status message(s) 218 received from the sensor node update manager 136 are stored in the database 200.

The example UAV manager 130 includes an example UAV status evaluator 220. The UAV status evaluator 220 provides means for analyzing the status message(s) 218 received from sensor node update manager 136 of the UAV 128 of FIG. 1. In some examples, the UAV status evaluator 220 provides means for generating instructions to be transmitted to the UAV 128 via the communicator 204 based on the status message(s) 218. For example, if the status message(s) 218 indicates that an error occurred during the FOTA update, the UAV status evaluator 220 can generate instructions for the FOTA update to end, for the UAV 128 to return to the UAV base, etc. As another example, if the firmware update 202 is to be delivered in two or more batches, the UAV status evaluator 220 can instruct the sensor node update manager 136 of the UAV 128 of FIG. 1 to deliver the second batch update after the UAV status evaluator 220 verifies that a status message 218 has been received confirming that the first batch update was successful. In other such examples, the sensor node update manager 136 of the UAV 128 does not wait for instructions from the UAV status evaluator 220 to begin the second batch update. In some examples, the UAV status evaluator 220 generates instructions for the status message(s) 218 to be presented via a display of, for example, the user device 124.

While an example manner of implementing the example UAV manager 130 is illustrated in FIG. 2, one or more of the elements, processes and/or devices illustrated in FIG. 2 may be combined, divided, re-arranged, omitted, eliminated and/or implemented in any other way. Further, the example database 200, the example communicator 204, the example firmware update manager 206, the example map generator 210, the example UAV status evaluator 220, and/or, more generally, the example UAV manager 130 of FIG. 2 may be implemented by hardware, software, firmware and/or any combination of hardware, software and/or firmware. Thus, for example, any of the example database 200, the example communicator 204, the example firmware update manager 206, the example map generator 210, the example UAV status evaluator 220, and/or, more generally, the example UAV manager 130 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example database 200, the example communicator 204, the example firmware update manager 206, the example map generator 210, the example UAV status evaluator 220, and/or, more generally, the example UAV manager 130 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example UAV manager 130 of FIGS. 1 and 2 may include one or more elements, processes and/or devices in addition to, or instead of, those illustrated in FIGS. 1 and 2, and/or may include more than one of any or all of the illustrated elements, processes and devices.

Figure 3:
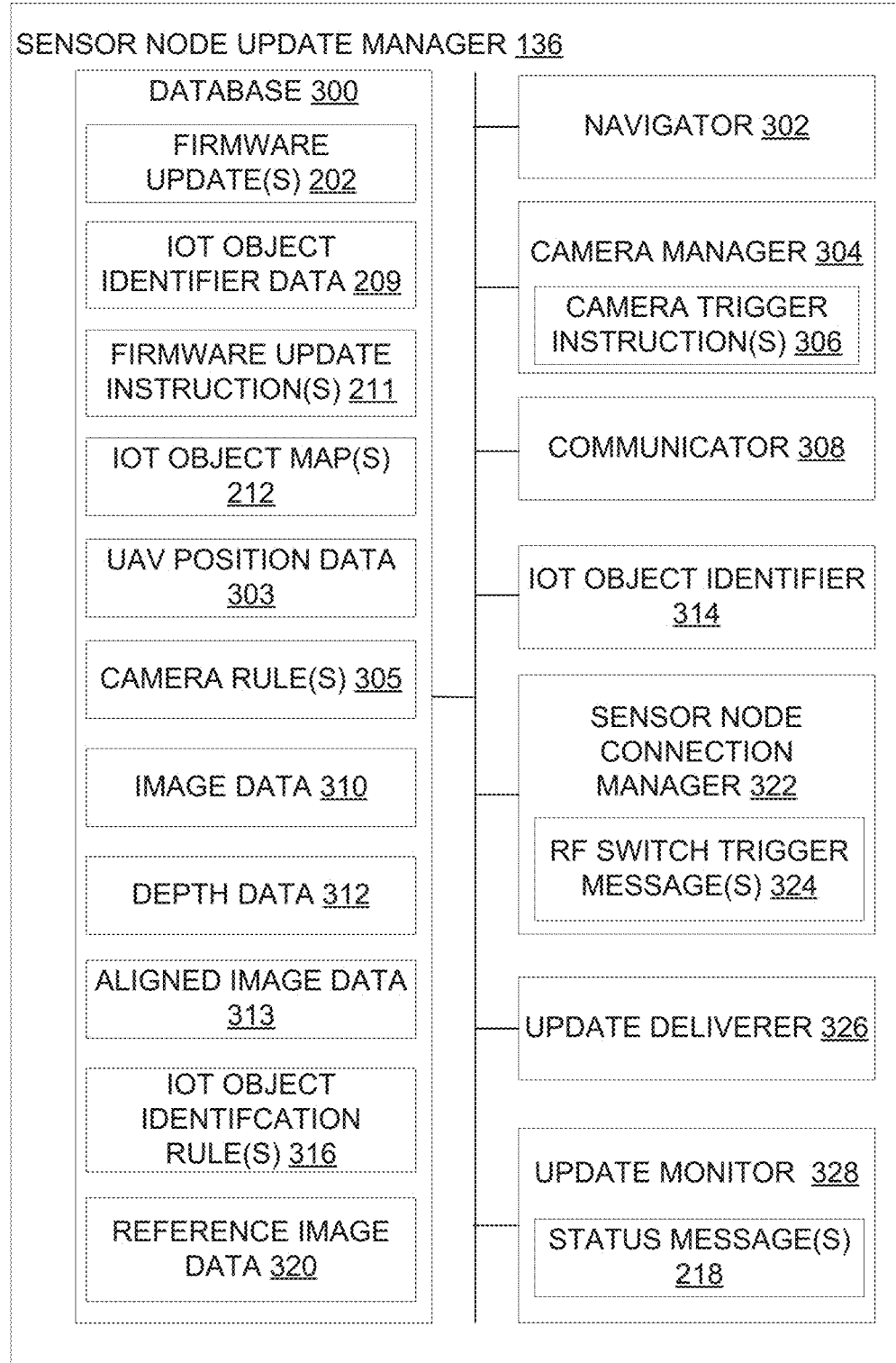
FIG. 3 is a block diagram of an example implementation of the sensor node update manager of FIG. 1.

FIG. 3 is a block diagram of an example implementation of the sensor node update manager 136 of FIG. 1. As mentioned above, the example sensor node update manager 136 is constructed to deliver one or more firmware updates (e.g., the firmware update(s) 202 of FIG. 2) to one or more sensor node(s) (e.g., the sensor node(s) 104, 108 of FIG. 1). In the example of FIG. 3, the sensor node update manager 136 is implemented by the processor 134 of the UAV 128.

The example sensor node update manager 136 includes an example database 300. In other examples, the database 300 is located external to the sensor node update manager 136 in a location accessible to the manager 136. As disclosed above, in some examples, the firmware update(s) 202 to be installed at the sensor node(s) are transmitted from the UAV manager 130 of FIGS. 1 and/or 2 to the sensor node update manager 136. In other examples, the firmware update(s) 202 are delivered to the sensor node update manager 136 from another processor (e.g., the processor(s) at which the firmware update(s) 202 were created). The database 300 of FIG. 3 provides means for storing the firmware update(s) 202.

As also disclosed above, the sensor node update manager 136 receives the IoT object identifier data 209 generated by the example firmware update manager 206 of FIG. 2 and indicating the IoT object(s) including the sensor node(s) to be updated. The database 300 of FIG. 3 provides means for storing the IoT object identifier data 209. In some examples, the sensor node update manager 136 receives firmware update instruction(s) 211 generated by the firmware update manager 206 of FIG. 2. The database 300 of FIG. 3 provides means for storing the firmware update instruction(s) 211.

As also disclosed above, in some examples, the sensor node update manager 136 receives the IoT object map(s) 212 from the map generator 210 of the UAV manager. The example database 300 of FIG. 3 provides means for storing the map(s) 212.

The example sensor node update manager 136 of FIG. 3 includes an example navigator 302. The navigator 302 provides means for navigating the UAV 128 to the IoT object(s) including the sensor node(s) to be updated. In the example of FIG. 3, the navigator 302 processes the IoT object map(s) 212 and generates instructions for the UAV 128 to fly along route(s) set forth in the map(s) 212. In some examples, the instructions generated by the navigator 302 are executed in connection with autopilot software installed on the UAV 128.

In the example of FIG. 3, the navigator 302 generates example UAV position data 303 as the UAV 128 flies. The UAV position data 303 can include, for example, a position of the UAV 128 relative to one or more waypoints in the map(s) 212 in substantially real-time. For example, the UAV position data 303 can include a position of the UAV 128 relative to the first street light 102 of FIG. 1. The UAV position data 303 is stored in the database 300.

The example sensor node update manager 136 of FIG. 3 includes an example camera manager 304. In the illustrated example, the camera manager 304 provides means for controlling the camera(s) 142 of the UAV 128. The example camera manager 304 of FIG. 3 applies one or more camera rule(s) 305 to control, for example, when the camera(s) 142 should begin collecting image and/or depth data, a duration for which the camera(s) 142 should collect data, a type of data to be collected (e.g., red-green-blue image data), etc. In some examples, camera rule(s) 305 include predefined threshold distances relative to the IoT object including the sensor node to be updated that define when the camera(s) 142 should start collecting data. The predefined threshold distances can be based on user input(s), the map(s) 212, the UAV position data 303, etc.

The example camera manager 304 generates example camera trigger instruction(s) 306 to activate the camera(s) 142 to collect image and/or depth data based on the camera rule(s) 305. The example sensor node update manager 136 includes an example communicator 308 to transmit the camera trigger instruction(s) 306 to the camera(s) 142. In response to the instruction(s) 306, the camera(s) 142 of FIG. 1 generate example image data 310 (e.g., color data, light data). In some examples, the camera(s) 142 generate example depth data 312 that includes measurements of distance(s) of the camera(s) 142 from, for example, the ground and/or objects in the IoT network 126 of FIG. 1 (e.g., the first street light 102). In the example of FIG. 3, the image data 310 and the depth data 312 are stored in the example database 300.

The example camera manager 304 of FIG. 3 performs one or more data processing techniques on the image data 310 and/or the depth data 312. For example, the camera manager 304 filters the image data 310 to adjust (e.g., reduce) brightness. The camera manager 304 aligns the image data 310 and the depth data 312 to create example aligned image data 313 containing 3-D coordinates (e.g., based on the image data 310 collected in the X-Y plane and the depth data 312 collected in the Z plane). The aligned image data 313 is stored in the database 300 of FIG. 3.

The example sensor node update manager 136 includes an example IoT object identifier 314. In the illustrated example, the IoT object identifier 314 provides means for identifying or recognizing the IoT object(s) in the IoT network including the sensor node(s) to be updated (e.g., the first street light 102) as the UAV 128 flies to the object. In the example of FIG. 3, the IoT object identifier 314 identifies or recognizes the IoT object(s) based on the IoT object identifier data 209 and one or more example IoT object identification rules(s) 316 stored in the database 300. In some examples, the IoT object identifier 314 recognizes the IoT object(s) based the UAV position data 303, the image data 310, the depth data 312, and/or the aligned image data 313.

The IoT object identification rule(s) 316 can include, for example, algorithms to be implemented by the IoT object identifier 314 to (1) identify or recognize one or more IoT objects of interest (e.g., a street light) as compared to other objects in the IoT network (e.g., a stop sign) and (2) to identify the particular IoT object(s) including the sensor node(s) to be updated (e.g., the first street light 102 including the first sensor node 104). The IoT identification rule(s) or algorithm(s) can be defined by user input(s).

For example, the IoT object identifier 314 compares the image data 310 and/or the aligned image data 313 to example reference image data 320 stored in the database 300 to determine that the UAV 128 is flying near an IoT object substantially similar to the IoT object including the sensor node to be updated. For example, the IoT object identifier 314 determines that the UAV 128 is flying near one or more street lights based on the image data 310, 313 and the reference image data 320. In some examples, the IoT object identifier 314 uses the UAV position data 303 generated by the navigator 302 and/or the map(s) 212 to confirm that UAV 128 is in an area including street lights. The reference image data 320 can include image data previously generated by the camera(s) 142 of the UAV 128 and stored in the database 300 (e.g., during previous flights based on the map(s) 212), image data provided via user input(s), etc.

When the IoT object identifier 314 determines that the UAV 128 is proximate to the IoT object(s) of interest (e.g., one or more street lights), the IoT object identifier 314 determines if the UAV 128 has reached the IoT object including the sensor node(s) to be updated (e.g., the first streetlight having the first sensor node 104). To identify the IoT object with the sensor node(s) to be updated, the IoT object identifier 314 analyzes the image data 310 and/or the aligned image data 313 to detect the identifier(s) of the IoT object(s) captured in the image data. The IoT object identifier 314 compares the identifier(s) of the IoT object(s) captured in the image data 310, 313 to the IoT object identifier data 209 stored in the database 300. Based on the comparison of the identifiers, the IoT object identifier 314 determines if the UAV 128 is proximate to (e.g., within a threshold distance) of the IoT object including the sensor node(s) to be updated.

In some examples, the example IoT object identifier 314 determines that the UAV 128 is not proximate to the IoT object including the sensor node(s) to be updated based on the comparison of the identifier(s) in the image data 310, 313 to the IoT object identifier data 209 stored in the database 300. In such examples, the example navigator 302 continues to instruct the UAV 128 to follow the map 212 to reach the particular IoT object (e.g., the first street light 102). The example UAV 128 continues to follow the map 212 until the IoT object identifier 314 determines that the UAV 128 is proximate to the IoT object including the sensor node(s) to be updated (e.g., based on the comparison of the identifier(s) in the image data 310, 313 generated during flight to the IoT object identifier data 209).

In some examples, the IoT object identifier 314 determines that UAV 128 is proximate to the IoT object including the sensor node(s) to be updated based on the UAV position data 303 alone, or the UAV position data 303 and the map(s) 212. In some examples, the IoT object identifier 314 determines that the UAV 128 is proximate to the IoT object including the sensor node(s) to be updated based on a strength level of a signal emitted by the sensor node to be updated that is detected by the UAV 128 when the UAV 128 is proximate to the IoT object including the sensor node In some examples, when the IoT object identifier 314 determines that UAV 128 is proximate to the IoT object including the sensor node(s) to be updated, the example navigator 302 instructs the UAV 128 to fly closer to the IoT object (e.g., the first street light 102). In some examples, the navigator 302 analyzes the aligned image data 313 including the depth measurements to position the UAV 128 proximate to the IoT object and/or a location of the sensor node relative to the IoT object. For example, the navigator 302 can instruct the UAV 128 to hover near the light portion of the first street light 102 of FIG. 1 where the first sensor node 104 may be located instead of hovering near the ground. Thus, the navigator 302 positions the UAV 128 to enable communication with the sensor node(s) to deliver the firmware update(s) 202 via one or more over-the-air updates.

The example sensor node update manager 136 includes an example sensor node connection manager 322. In the illustrated example, the sensor node connection manager 322 provides means for communicating with the sensor node(s) that is (are) to receive the firmware update(s) 202 via the UAV 128. As disclosed above, a sensor node to be updated, such as the first sensor node 104 of FIG. 1, typically operates in the low power wireless mode (e.g., communication over the sub-1 GHz frequency band) when collecting sensor data and transmitting the sensor data to the master node 116 of FIG. 1. The example sensor node connection manager 322 of FIG. 3 directs the communicator 308 to establish communication with the first sensor node 104 operating in low power wireless mode by transmitting one or more messages via the second (e.g., low speed) RF module 140 of the UAV 128. The example sensor node connection manager 322 instructs the communicator 308 to use one or more communication protocols to communicate with the first sensor node 104 via the second RF module 140 (e.g., WiFi over the sub-1 GHz frequency band, Zigbee™, SigFox™). In some examples, the sensor node connection manager 322 instructs the communicator 308 to communicate with the local sensor network 118 of FIG. 1 to verify compliance of UAV 128 with security parameters, authentication parameters, etc. to enable the UAV 128 to communicate with the sensor nodes in the local sensor network 118. Thus, in the example of FIG. 3, the UAV 128 acts as a node (e.g., a host node) in the local sensor network 118 to communicate with the first sensor node 104.

The example sensor node connection manager 322 of FIG. 3 generates one or more example RF switch trigger messages 324 for the sensor node to be updated. For example, the RF switch trigger message 324 includes instructions for the first sensor node 104 to switch from the first or low power wireless mode to the second or high speed wireless mode (e.g., communication over the high frequency 2.4 GHz or 5 GHz frequency band). The example communicator 308 of FIG. 3 transmits the RF switch trigger message(s) 324 to the first sensor node 104 over, for example, the sub-1 GHz frequency band.

As disclosed above, in response to receiving the RF switch trigger message(s) 324, the dual-band RF module 114 of the first sensor node 104 of FIG. 1 switches from the low power wireless mode to the high speed wireless mode. In some examples, the first sensor node 104 sends a message to the sensor node connection manager 322 confirming that the first sensor node 104 is operating in the high speed wireless mode. When the first sensor node 104 is operating in the high speed wireless mode, the sensor node connection manager 322 instructs the communicator 308 to establish point-to-point connectivity with the first sensor node 104 over, for example, the 2.4 GHz frequency band, via the first (e.g., high speed) RF module 138. Thus, communication is established between the sensor node update manager 136 of the UAV 128 and the first sensor node 104 when the first sensor node 104 is operating in the high speed wireless mode.

The example sensor node update manager 136 includes an example update deliverer 326. In the illustrated example, the update deliverer 326 provides means for delivering the firmware update(s) 202 to the sensor node(s) to be updated. The update deliverer 326 accesses the firmware update(s) 202 stored in the database 300 of FIG. 3. The update deliverer 326 also accesses the firmware instruction(s) 211. The update deliverer 326 instructs the communicator 308 to deliver the firmware update(s) 202 to the first sensor node 104 based on the firmware instruction(s) 211. Thus, the sensor node update manager 136 of FIG. 3 provides for FOTA updates at the first sensor node 104.

The example sensor node update manager 136 of FIG. 3 includes an example update monitor 328. In the illustrated example, the update monitor 328 provides means for monitoring the status of the installation of the firmware update(s) 202 at sensor node(s) (e.g., the first sensor node 104 of FIG. 1). For example, the update monitor 328 generates status requests that are transmitted to the processor 112 of the first sensor node 104. In response to the status requests, the first sensor node 104 sends message(s) regarding the installation progress of the firmware update(s) 202. Based on the status of the firmware update installation, the update monitor 328 generates the status message(s) 218 that are transmitted by the communicator 308 of FIG. 3 to the UAV manager 130 of FIG. 2, as disclosed above in connection with FIG. 2. The update monitor 328 can generate the status message(s) 218 at frequency defined by user input(s) received by the UAV manager 130 and/or the sensor node update manager 136 (e.g., periodically, only when an error occurs).

As disclosed above, when the FOTA update is complete at the first sensor node 104, the first sensor node 104 reboots to complete installation of the firmware update and to begin using the updated firmware. Also, the first sensor node 104 sends a message to the example update monitor 328 of FIG. 3 confirming that the FOTA update is complete. The example update monitor 328 confirms that the FOTA update was successful (e.g., by checking for any error messages and verifying resolution of the errors).

When the update monitor 328 confirms that the FOTA update was successful, the example sensor node connection manager 322 generates an example RF switch trigger message 324 instructing the first sensor node 104 to switch from the high speed wireless mode to the low power wireless mode. Also, the example navigator 302 instructs the UAV 128 to fly to the next waypoint on the map (e.g., the second street light 106) or to return to the UAV base. Thus, the example sensor node update manager 136 provides for autonomous updating of IoT object sensor node(s) in an IoT network via the UAV 128.

As mentioned above, in some examples, one or more components of the UAV manager 130 may be implemented by the sensor node update manager 136. For example, the map generator 210 can be implemented by the sensor node update manager 136 of FIG. 3 to generate the map(s) 212 at the UAV 128. Similarly, one or more components of the sensor node update manager 136 may be implemented by the UAV manager 130. For example, the camera manager 304 can be implemented by the UAV manager 130 to control the camera(s) 142 via, for example, the user device 124.

While an example manner of implementing the example sensor node update manager 136 is illustrated in FIG. 3, one or more of the elements, processes and/or devices illustrated in FIG. 3 may be combined, divided, re-arranged, omitted, eliminated and/or implemented in any other way. Further, the example database 300, the example navigator 302, the example camera manager 304, the example communicator 308, the example IoT object identifier 314, the example sensor node connection manager 322, the example update deliverer 326, the example update monitor 328, and/or, more generally, the example sensor node update manager 136 of FIG. 3 may be implemented by hardware, software, firmware and/or any combination of hardware, software and/or firmware. Thus, for example, any of the example database 300, the example navigator 302, the example camera manager 304, the example communicator 308, the example IoT object identifier 314, the example sensor node connection manager 322, the example update deliverer 326, the example update monitor 328, and/or, more generally, the example sensor node update manager 136 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example database 300, the example navigator 302, the example camera manager 304, the example communicator 308, the example IoT object identifier 314, the example sensor node connection manager 322, the example update deliverer 326, the example update monitor 328, and/or, more generally, the example sensor node update manager 136 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example sensor node update manager 136 of FIGS. 1 and 3 may include one or more elements, processes and/or devices in addition to, or instead of, those illustrated in FIGS. 1 and 3, and/or may include more than one of any or all of the illustrated elements, processes and devices.

Figure 4:
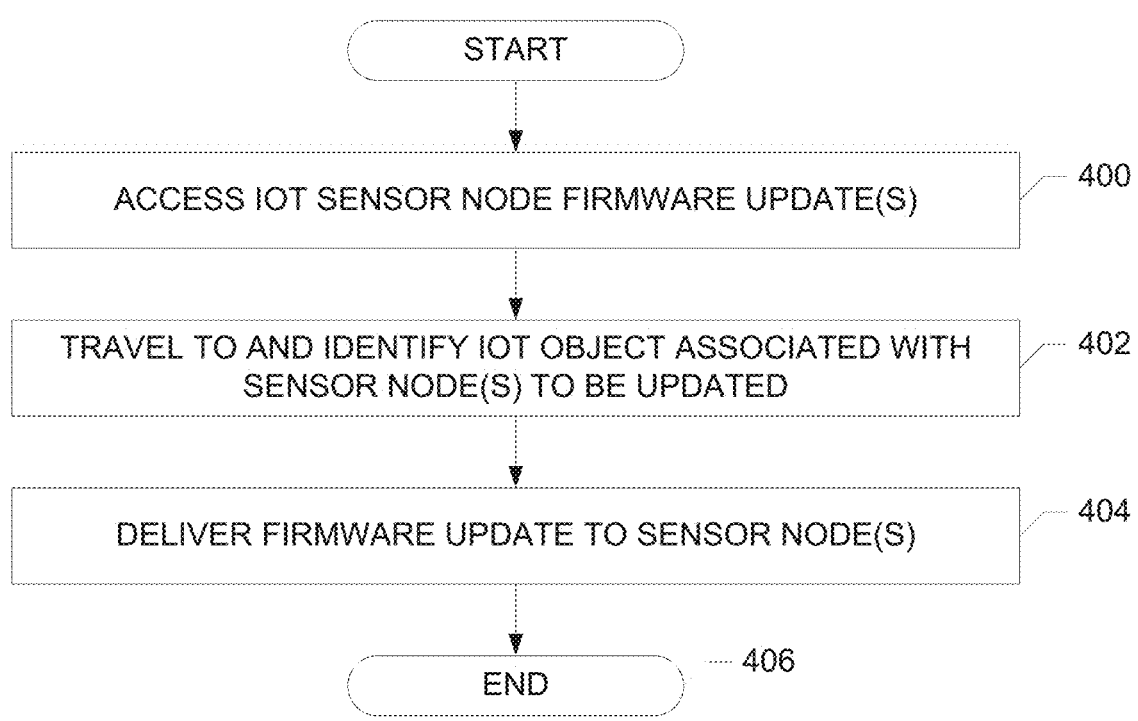
FIG. 4 is a flowchart representative of example machine readable instructions that may be executed to implement the example sensor node update manager of FIGS. 1 and/or 3.
Figure 5:
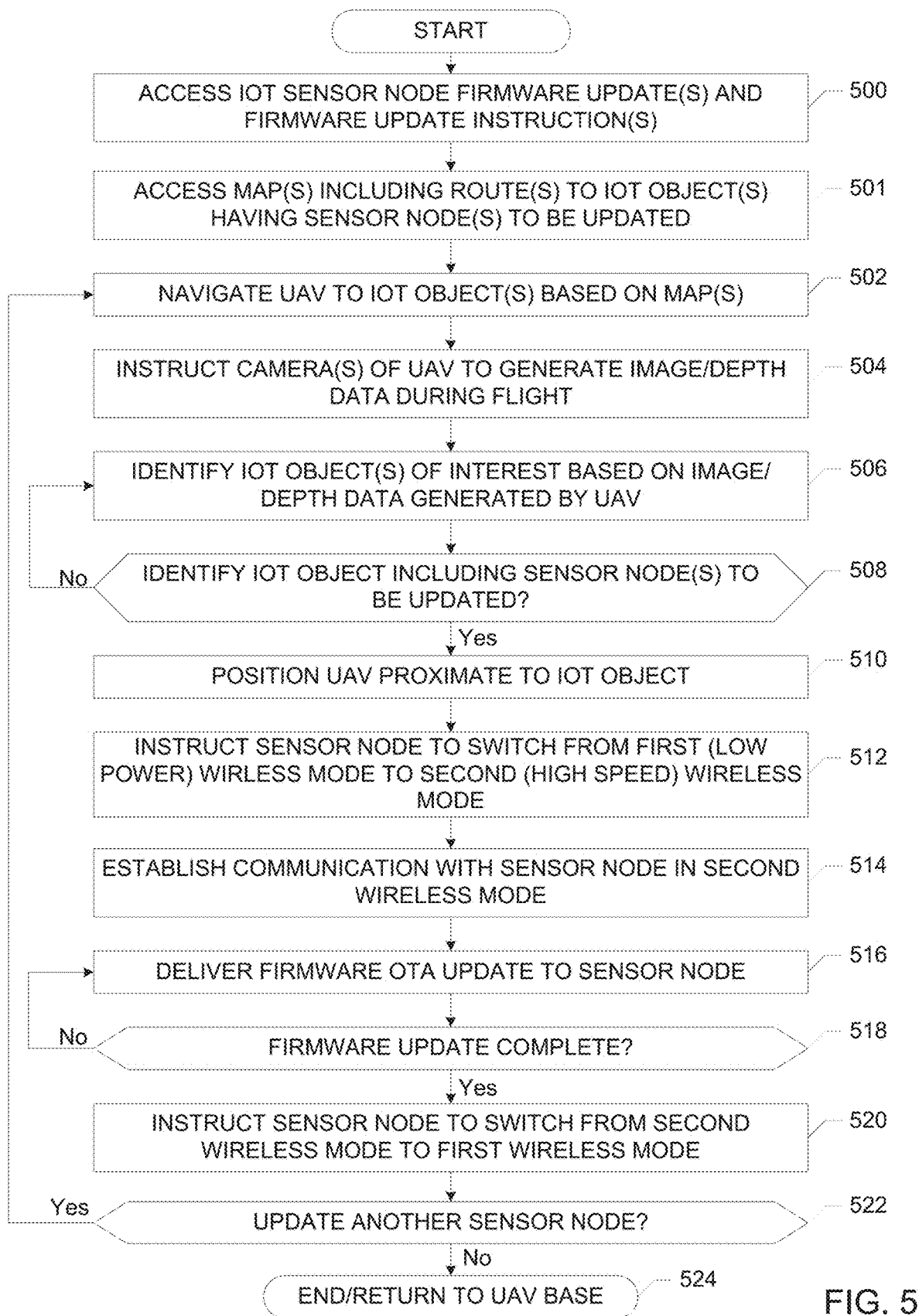
FIG. 5 is a flowchart representative of second example machine readable instructions that may be executed to implement the example sensor node update manager of FIGS. 1 and/or 3.
Figure 6:
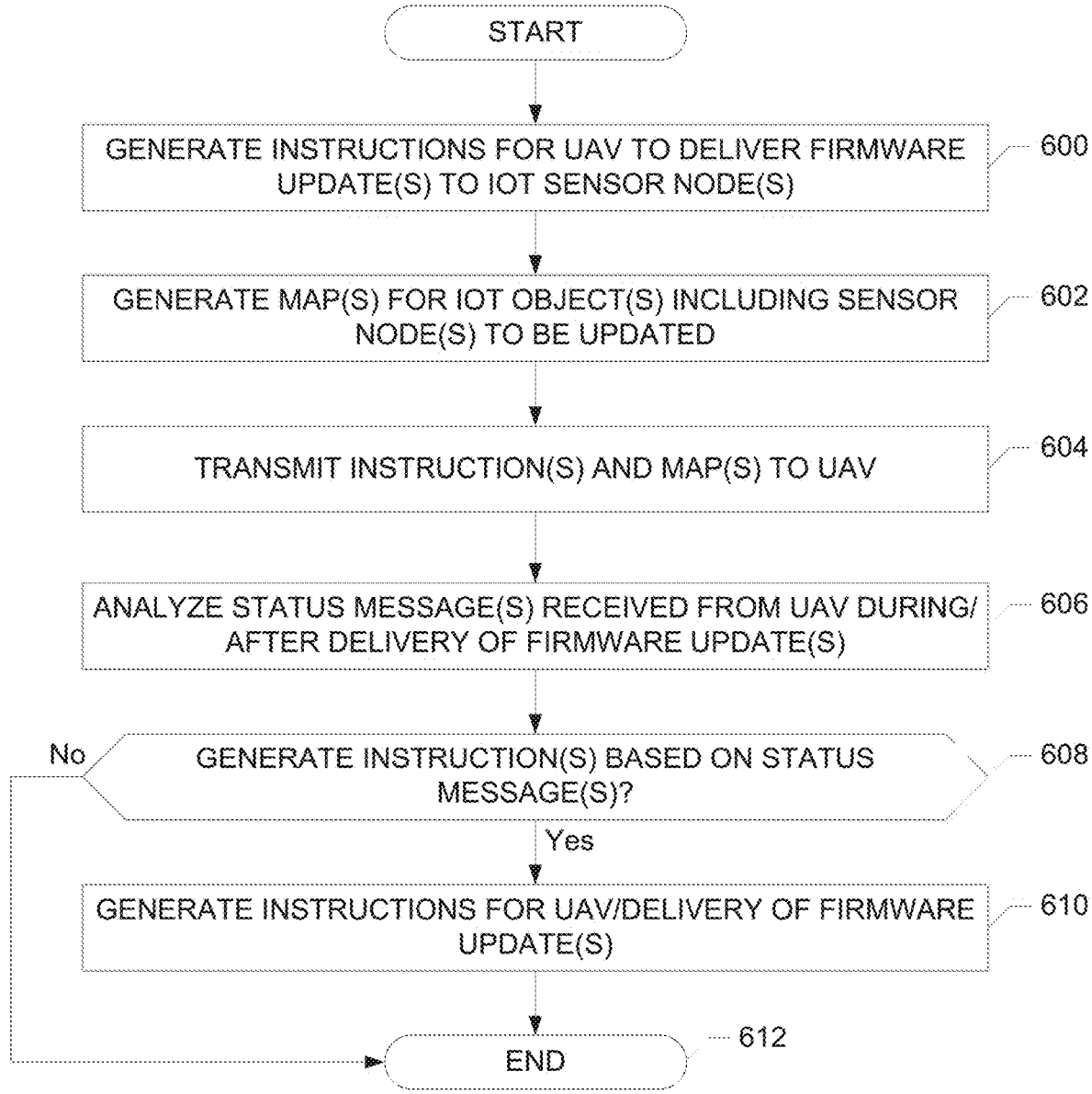
FIG. 6 is a flowchart representative of example machine readable instructions that may be executed to implement the example UAV manager of FIGS. 1 and/or 2.

Flowcharts representative of example machine readable instructions for implementing the example system 100 and/or components thereof illustrated in FIGS. 1-3 is shown in FIGS. 4-6. In these examples, the machine readable instructions comprise one or more programs for execution by one or more processors such as the processors 130, 136 shown in the example processor platforms 700, 800 discussed below in connection with FIGS. 7 and 8. The program(s) may be embodied in software stored on a non-transitory computer readable storage medium such as a CD-ROM, a floppy disk, a hard drive, a digital versatile disk (DVD), a Blu-ray disk, or a memory associated with the processor(s) 130,136, but the entire program(s) and/or parts thereof could alternatively be executed by a device other than the processor(s) 130,136 and/or embodied in firmware or dedicated hardware. Further, although the example program(s) are described with reference to the flowcharts illustrated in FIGS. 4-6, many other methods of implementing the example system 100 and/or components thereof illustrated in of FIGS. 1-3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 4 is a flowchart of example machine readable instructions that, when executed, cause the example sensor node update manager 136 of FIGS. 1 and/or 3 to provide an over-the-air update (e.g., an FOTA update) to a sensor node (e.g., the first sensor node 104 of FIG. 1) associated with an IoT object or device (e.g., the first street light 102 of FIG. 1) in an IoT network (e.g., the IoT network 126 of FIG. 1). In the example of FIG. 4, the FOTA update can be delivered to the sensor node via a UAV (e.g., the UAV 128 of FIG. 1). The example instructions of FIG. 4 can be executed by, for example, the processor 134 of FIG. 1 to implement the sensor node update manager 136 of FIGS. 1 and/or 3.

The example update deliverer 326 of the sensor node update manager 136 of FIG. 3 accesses the firmware update(s) 202 to be delivered to one or more sensor node(s) in an IoT network and the firmware instruction(s) 211 (block 400). In some examples, the firmware update(s) 202 are generated by the firmware update manager 206 of the UAV manager 130 of FIG. 2 and transmitted to the sensor node update manager 136 of FIG. 3. The firmware update(s) 202 and the firmware update instruction(s) 211 are stored in the database 300 of FIG. 3.

The example navigator 302 generates instructions to navigate the UAV 128 to the IoT object(s) including the sensor node(s) to be updated and the IoT object identifier 314 identifies the IoT object(s) (block 402). The example navigator 302 generates the instructions to navigate the UAV 128 based on map(s) 212 that include route(s) for the UAV 128 to fly to reach the IoT object(s) (block 402). The map(s) 212 can be generated by the example map generator 210 of the UAV manager 130 of FIG. 2 and transmitted to the sensor node manager 136 of FIG. 3. In other examples, the map generator 210 is implemented by the sensor node manager 136 of FIG. 3.

During flight, the example camera(s) 142 of the UAV 128 generate image data 310 including representations of the IoT objects in the IoT network 126. The example camera manager 304 processes the image data 310 and depth data 312 generated by the camera(s) 142 to generate aligned image data 313. The IoT object(s) in the example IoT network 126 (e.g., the street lights 102, 106) include respective identifier(s) 105, 107, such as graphical identifiers. The identifiers 105, 107 are represented in the image data 310 and/or the aligned image data 313. The example IoT object identifier 314 identifies an IoT object including a sensor node to be updated based on IoT object identification rule(s) 316 (e.g., the first street light 102 including the first sensor node 104). For example, the IoT object identifier 314 compares the identifier(s) represented in the image data 310, 313 to known identifier(s) for IoT object(s) having sensor node(s) to be updated (e.g., IoT object identifier data 209 stored in the database 300 of FIG. 3).

When the IoT object identifier 314 identifies the IoT object including the sensor node to be updated, the update deliverer 326 delivers the firmware update 202 to the sensor node (block 404). In some examples, the sensor node (e.g., the sensor node 104 of FIG. 1) operates in a low power wireless mode (e.g., communication over the sub-1 GHz frequency band) to collect and transmit sensor data. The sensor node connection manager 322 sends RF switch trigger message(s) 324 to the sensor node via the first (e.g., low speed) RF module of the UAV 128. The message(s) 324 instruct the sensor node to switch from operating in the low power wireless mode to a high speed wireless mode (e.g. communication over the 2.4 GHz frequency band). When the sensor node has switched to operating in the high speed wireless mode, the update deliverer 326 establishes communication with the sensor node via the first (e.g., high speed) RF module 138 of the UAV 128. The update deliverer 326 delivers the firmware update 202 to the sensor node 104 (e.g., the processor 112 of the sensor node 104) via the first RF module 138.

When the firmware update 202 is complete at the sensor node, the sensor node connection manager 322 sends RF switch trigger message(s) 324 to the sensor node via the first (e.g., high speed) RF module 138, instructing the sensor node to switch back to the low power wireless mode. The example instructions of FIG. 4 end when the UAV 128 has delivered the firmware update(s) to the sensor node(s) of the IoT object(s) that are to receive the update(s) (block 406).

FIG. 5 is a flowchart of second example machine readable instructions that, when executed, cause the example sensor node update manager 136 of FIGS. 1 and/or 3 to provide an over-the-air update (e.g., an FOTA update) to a sensor node (e.g., the first sensor node 104 of FIG. 1) associated with an IoT object or device (e.g., the first street light 102 of FIG. 1) in an IoT network (e.g., the IoT network 126 of FIG. 1). In the example of FIG. 5, the FOTA update can be delivered to the sensor node via a UAV (e.g., the UAV 128 of FIG. 1). The example instructions of FIG. 5 can be executed by, for example, the processor 134 of FIG. 1 to implement the sensor node update manager 136 of FIGS. 1 and/or 3.

The example update deliverer 326 of the sensor node update manager 136 of FIG. 3 accesses the firmware update(s) 202 to be delivered to one or more sensor node(s) in an IoT network and the firmware instruction(s) 211 (block 500). In some examples, the firmware update(s) 202 and the instruction(s) 211 are generated by the firmware update manager 206 of the UAV manager 130 of FIG. 2 and transmitted to the sensor node update manager 136 of FIG. 3. The firmware update(s) 202 and the firmware update instruction(s) 211 are stored in the database 300 of FIG. 3.

The example navigator 302 accesses the IoT object map(s) 212 generated by the example map generator 210 of FIG. 2 (block 501). The IoT map(s) 212 are stored in the database 300 of FIG. 3. The IoT map(s) 212 include route(s) to the IoT object(s) having the sensor node(s) to be updated. For example, the map generator 210 of FIG. 2 generates a map 212 including a route for the UAV 128 to fly to reach the first street light 102 including the first sensor node 104. In some examples, the map generator 210 automatically generates the map(s) 212 based on a determination by the firmware update manager 206 of FIG. 2 that, for example, the first sensor node 104 should be updated and one or more mapping rules 214 stored in the database 200 of FIG. 2. In some examples, the map generator 210 generates the map(s) 212 based on user input(s) received via, for example, the user device 124. The user input(s) can include, for example, preferred UAV routes, time constraints, etc. In some examples, the map generator 210 is implemented by the UAV manager 130 of FIG. 2 and the map(s) 212 are transmitted to the sensor node update manager 136 of FIG. 2. In other examples, the map generator 210 is implemented by the sensor node update manager 136 of FIG. 3.

The navigator 302 of the sensor node update manager 136 generates instructions to navigate the UAV 128 to the IoT object(s) including the sensor node(s) to be updated based on the map(s) 212 (block 502). In some examples, the navigator 302 communicates with autopilot software of the UAV 128 to navigate the UAV 128 based on the map(s) 212. In some examples, the navigator 302 generates position data 303 with respect to a position of the UAV 128 relative to one or more waypoints in the map 212 (e.g., in real-time).

The example camera manager 304 of FIG. 3 generates camera trigger instruction(s) 306 directing the camera(s) 142 of the UAV 128 to generate image data 310 and/or depth data 312 (e.g., measurements of the distance of the UAV 128 from the ground) during flight (block 504). For example, the camera manager 304 instructs the camera(s) 142 to generate the image data 310 and/or the depth data 312 based on, for example, the UAV position data 303 indicating that the UAV 128 is within a threshold distance of the IoT object having the sensor node to be updated (e.g., the first street light 102). The camera manager 304 processes the image data 310 and the depth data 312 to generate aligned image data 313 (e.g., 3-D image data).

The example IoT object identifier 314 identifies IoT object(s) of interest, or IoT object(s) substantially similar to the IoT object including the sensor node to be updated (block 506). In some examples, the IoT object identifier 314 identifies the IoT object(s) based on the IoT object identification rule(s) 316, the image data 310, the aligned image data 313, and the reference image data 320. For example, the IoT object identifier 314 compares the image data 310 and/or the aligned image data 313 to reference image data 320 to identify the IoT objects captured in the image data. Based on the comparison, the IoT object identifier 314 recognizes that UAV 128 is proximate to IoT objects that may include the sensor node to be updated. For example, when the first sensor node 104 of the first street light 102 is to be updated, the IoT object identifier 314 recognizes that the UAV 128 is proximate to one or more street lights as compared to, for example a stop sign.

The IoT object identifier 314 analyzes the image data 310, 313 to identify the IoT object including the sensor node to updated (block 508). For example, the IoT object identifier 314 determines if any the identifier(s) of the IoT object(s) captured in the image data 310, 313 correspond to the identifier 105 associated with the first street light 102 based on the IoT object identifier data 209. In some examples, the IoT object identifier 314 identifies the IoT object having the sensor node to be updated based on the position data 303 and/or the map(s) 212. In other examples, the IoT object identifier 314 identifies the IoT object having the sensor node(s) to be updated based on a strength of a signal emitted by the sensor node(s).

The IoT object identifier 314 continues to analyze the image data 310, 313 until the IoT object identifier 314 recognizes the IoT object including the sensor node to be updated (e.g., the first street light 102 of FIG. 1). The example navigator 302 of FIG. 3 positions the UAV 128 proximate to the IoT object (block 510). For example, the navigator 302 uses the aligned image data 313 and/or the position data 303 to position UAV 128 to hover proximate to the first street light 102.

The example sensor node connection manager 322 instructs the sensor node to switch from operating in a first or low power wireless mode (e.g., communication over the sub-1 GHz frequency band) to a second or high speed wireless mode (e.g., communication over the 2.4 GHz frequency band, BLE) (block 512). For example, the sensor node connection manager 322 generates an RF switch trigger message 324 that is transmitted by the communicator 308 of FIG. 3 to the first sensor node 104 when the sensor node is operating in the low power wireless mode (e.g., the message is transmitted to the first sensor node over the sub-1 GHz frequency band). In response to the RF switch trigger message 324, the dual-band RF module 114 of the first sensor node 104 switches from the low power wireless mode to the high speed wireless mode.

When the sensor node is operating in the second or high speed wireless mode, the sensor node connection manager 322 establishes communication (e.g., point-to-point connectivity via BLE) with the sensor node (block 514). The update deliverer 326 delivers the firmware update(s) 202 to the sensor node as an over-the-air updated (block 516). In some examples, the update monitor 328 monitors the installation progress of the firmware update(s) and generates status message(s) 218 that are transmitted to the UAV status evaluator 220 of the UAV manager 130 of FIG. 2. In some examples, the firmware updates are delivered in two or more batches based on the status message(s) 218 indicating that a respective batch update is complete.

When the firmware update is complete (block 518), the sensor node connection manager 322 instructs the sensor node to switch from the second or high speed wireless mode to the first or low power wireless mode (block 520). For example, the sensor node connection manager 322 generates an RF switch trigger message 324 that is transmitted to the first sensor node 104 via the communicator 308 of FIG. 3.

In response, the RF module 114 of the first sensor node 104 returns to operating in the low power wireless mode to generate sensor data via the sensor 110 and to transmit the sensor data to, for example, the master node 116 in the local sensor network 118 of FIG. 1.

The update deliverer 326 determines whether another sensor node is to be updated (block 522). If another sensor node is to be updated (e.g., the second sensor node 108 of the second street light 106 of FIG. 1), the navigator 302 navigates the UAV 128 to the IoT object including the sensor node to be updated. When there are no other sensor nodes to be updated, the instructions of FIG. 4 end and the UAV 128 may return to its base (block 524).

FIG. 6 is a flowchart of example machine readable instructions that, when executed, cause the example UAV manager 130 of FIGS. 1 and/or 2 to instruct a UAV (e.g., the UAV 128 of FIG. 1) to deliver an over-the-air update (e.g., an FOTA update) to a sensor node (e.g., the first sensor node 104 of FIG. 1) associated with an IoT object or device (e.g., the first street light 102 of FIG. 1) in an IoT network (e.g., the IoT network 126 of FIG. 1). The example instructions of FIG. 6 can be executed by, for example, the processor 132 of the user device 124 of FIG. 1, the server 122 of FIG. 1, and/or one or more cloud-based devices 120 of FIG. 1 to implement the UAV manager 130 of FIGS. 1 and/or 2.

The example firmware update manager 206 generates one or more firmware update instructions 211 to instruct the example UAV 128 to fly to one or more sensor node(s) to deliver one or more firmware update(s) to the sensor node(s) (block 600). The firmware update instruction(s) 211 can be based on user input(s) with respect to, for example, the sensor node(s) to be updated, a timeline for delivering the update(s), how the update(s) are to be delivered (e.g., in one or more batches), etc. In some examples, the firmware update manager 206 automatically determines which sensor node(s) are to be updated based on firmware update rule(s) 208 stored in the database 200 of FIG. 2. The firmware update manager 206 generates IoT object identifier data 209 including the identifier(s) 105, 107 of the IoT object(s) including the sensor nodes to be updated.

The example map generator 210 of FIG. 2 generates one or more maps 212 for the IoT object(s) including the sensor node(s) to be updated (e.g., the first street light 102 including the first sensor node 104) (block 402). The map generator 210 generates the map(s) 212 based on mapping rules(s) 214 and IoT object location data 216 stored in the database 200 of FIG. 2. The mapping rule(s) 214 include, for example, preferred routes for the UAV 128 to fly. The IoT object location data 216 includes location(s) of the IoT object(s) having the sensor node(s) to be updated. The map(s) 212 generated by the map generator 210 include route(s) for the UAV 128 to fly to reach the IoT object(s) having the sensor node(s) to be updated.

The example communicator 204 of FIG. 2 transmits the firmware update instruction(s) 211 (e.g., including the IoT identifier data 209) and the map(s) 212 to the UAV 128 for storage and/or execution by the example sensor node update manager 136 of FIG. 3 (block 604). In some examples, the communicator 204 transmits the firmware update(s) 202 to the UAV 128. In other examples, the firmware update(s) 202 are transmitted to the UAV 128 for storage via another processor.

During the delivery of the firmware update(s) 202 to the sensor node(s) and/or after the firmware update(s) 202 are complete, the example update monitor 328 of the sensor node update manager 136 of FIG. 2 generates status message(s) 218 and transmits the status message(s) from the UAV 128 to the UAV manager 130. The UAV status evaluator 220 of the UAV manager 130 of FIG. 3 analyzes the status message(s) 218 (block 606). For example, based on the status message(s) 218, the UAV status evaluator 220 determines whether the firmware update(s) were successfully installed, whether an error occurred during installation, etc.

The example UAV status evaluator 220 determines whether instruction(s) should be generated based on the status message(s) 218 (block 608) and, if so, generates the instruction(s) (block 610). For example, the UAV status evaluator 220 can generate instructions for the UAV 128 to return to the UAV base if an error occurred during installation of the firmware update(s). As another example, the UAV status evaluator 220 can generate instruction(s) for the UAV 128 to deliver a second batch firmware update to the sensor node(s) after determining that that first batch firmware update was successfully installed based on the status message(s) 218.

The example instructions of FIG. 6 end when there are no further instructions for the UAV manager 130 to transmit to the UAV 128 (block 612).

Figure 7:
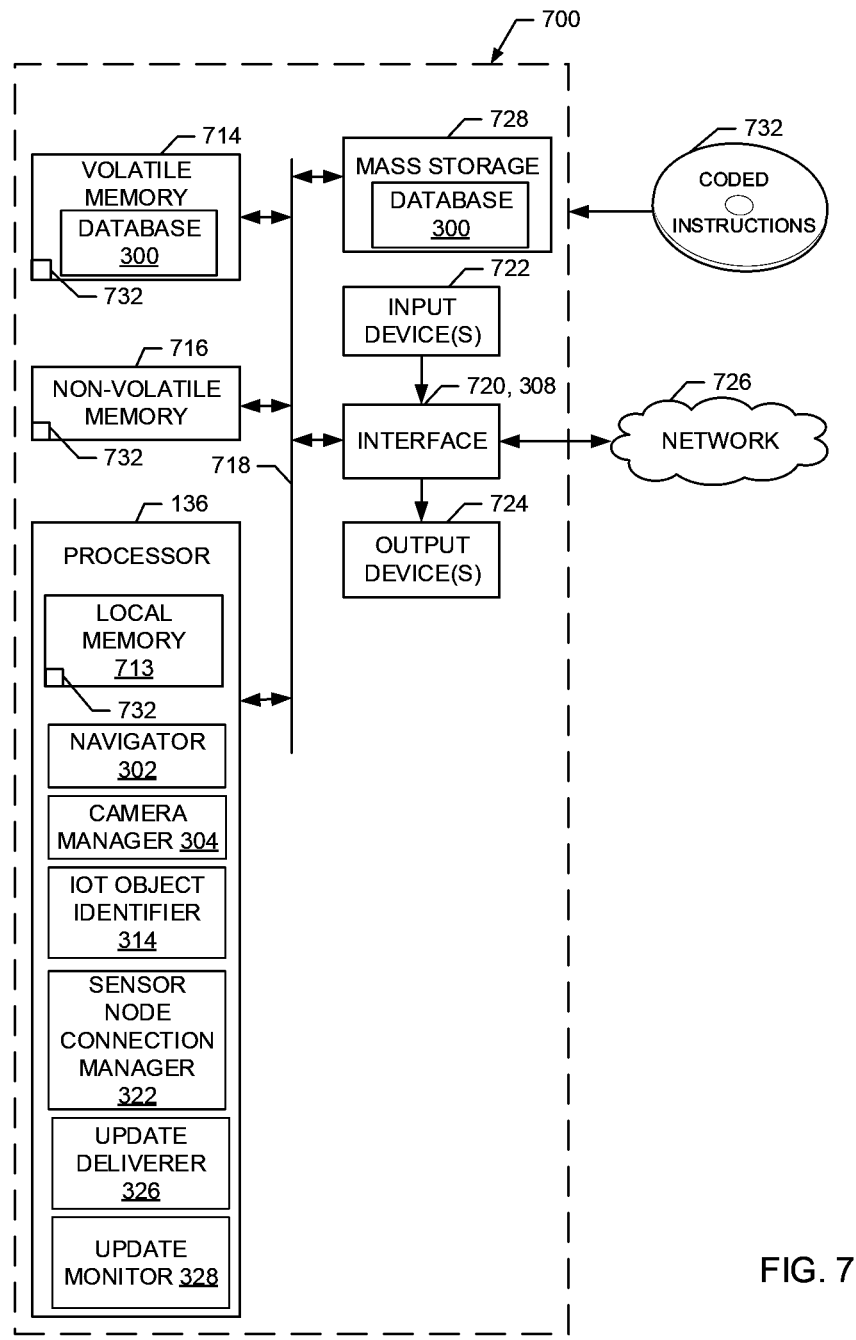
FIG. 7 illustrates a first example processor platform structured to execute one or more of the example instructions of FIGS. 4 and/or 5 to implement the example sensor node update manager of FIGS. 1 and/or 3.

FIG. 7 is a block diagram of an example processor platform 700 capable of executing one or more of the instructions of FIGS. 4 and/or 5 to implement the sensor node update manager 136 of FIGS. 1 and/or 3. The processor platform 700 can be, for example, a server, a personal computer, a mobile device (e.g., a cell phone, a smart phone, a tablet such as an iPad™), a personal digital assistant (PDA), an Internet appliance, a drone, or any other type of computing device.

The processor platform 700 of the illustrated example includes a processor 136. The processor 136 of the illustrated example is hardware. For example, the processor 136 can be implemented by one or more integrated circuits, logic circuits, microprocessors or controllers from any desired family or manufacturer. The hardware processor may be a semiconductor based (e.g., silicon based) device. In this example, the processor 136 implements the example navigator 302, the example camera manager 304, the example IoT object identifier 314, the example sensor node connection manager 322, the example update deliverer 326, and/or the example update monitor 328 of the example sensor node update manager 136.

The processor 136 of the illustrated example includes a local memory 713 (e.g., a cache). The processor 136 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. The database 300 of the sensor node update manager may be implemented by the main memory 714, 716 and/or the local memory 713.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and/or commands into the processor 136. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.). In this example, the communicator 308 is implemented by the interface circuit 720.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4 and/or 5 may be stored in the mass storage device 728, in the volatile memory 714, in the non-volatile memory 716, and/or on a removable tangible computer readable storage medium such as a CD or DVD.

Figure 8:
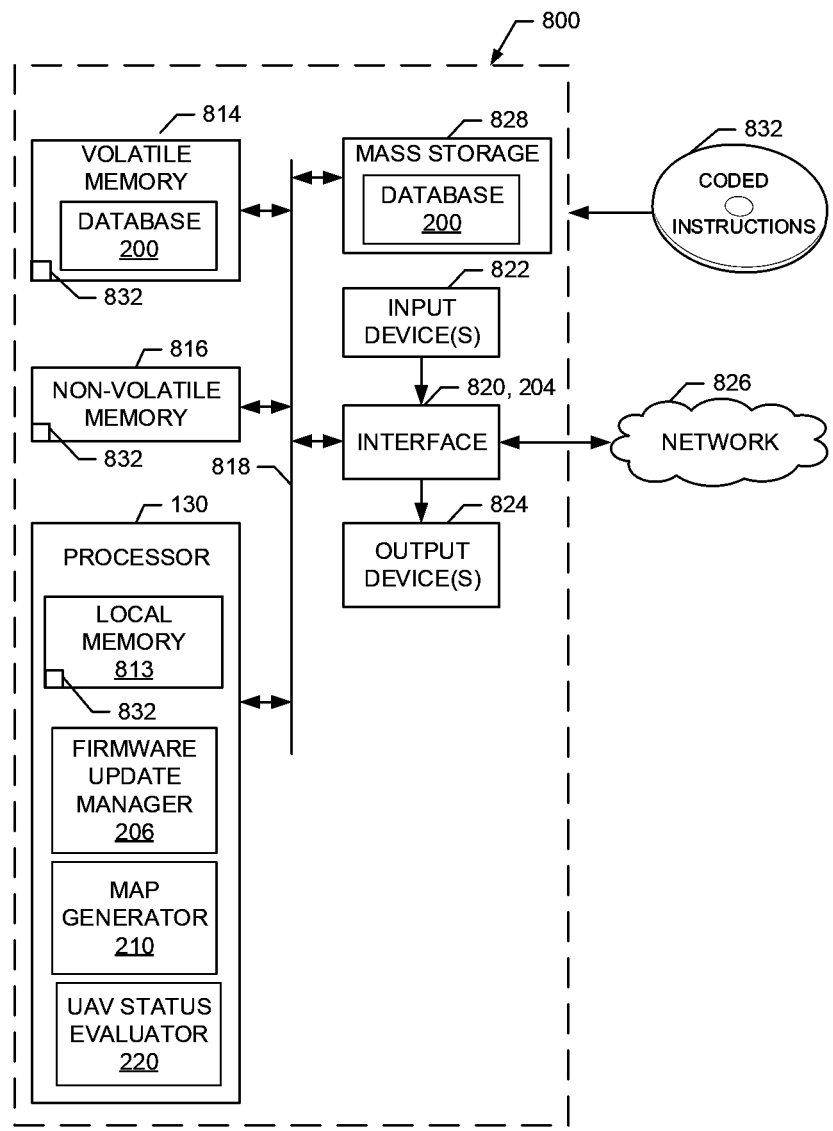
FIG. 8 illustrates a second example processor platform structured to execute one or more of the example instructions of FIG. 6 to implement the example UAV manager of FIGS. 1 and/or 2.

FIG. 8 is a block diagram of an example processor platform 800 capable of executing one or more of the instructions of FIG. 6 to implement the UAV manager 130 of FIGS. 1 and/or 2. The processor platform 800 can be, for example, a server, a personal computer, a mobile device (e.g., a cell phone, a smart phone, a tablet such as an iPad'), a personal digital assistant (PDA), an Internet appliance, or any other type of computing device.

The processor platform 800 of the illustrated example includes a processor 130. The processor 130 of the illustrated example is hardware. For example, the processor 130 can be implemented by one or more integrated circuits, logic circuits, microprocessors or controllers from any desired family or manufacturer. The hardware processor may be a semiconductor based (e.g., silicon based) device. In this example, the processor 130 implements the example firmware update manager 206, the example map generator 210, and/or the example UAV status evaluator 220 of the example UAV manager 130.

The processor 130 of the illustrated example includes a local memory 813 (e.g., a cache). The processor 130 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. The database 200 of the UAV manager may be implemented by the main memory 814, 816 and/or the local memory 813.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 130. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.). In this example, the communicator 204 is implemented by the interface circuit 820.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 6 may be stored in the mass storage device 828, in the volatile memory 814, in the non-volatile memory 816, and/or on a removable tangible computer readable storage medium such as a CD or DVD.

From the foregoing, it will be appreciated that example methods, systems, and apparatus have been disclosed to deliver firmware-over-the-air (FOTA) updates to sensor nodes in an IoT network using unmanned aerial vehicles (UAVs). Disclosed examples store the firmware update to be installed at the sensor node on the UAV and instruct the UAV to fly to an IoT object having the sensor node to be updated. Disclosed example UAVs automatically communicate with the sensor node to install the update. Disclosed examples cause the sensor node to switch from operating in a low power wireless mode for collecting and transmitting sensor data (e.g., communication over the sub-1 GHz frequency band) to a high speed wireless mode (e.g., communication over the 2.4 GHz frequency band). Disclosed examples deliver the FOTA update via the UAV when the sensor node is operating in the high speed wireless mode. Thus, disclosed examples provide for efficient delivery of the FOTA update as compared to the FOTA update being delivered while the sensor node was operating the low power wireless mode. Further, using the example UAVs disclosed herein to deliver the FOTA update effectively addresses the proximity requirements for delivering the FOTA update via wireless communication protocols. Disclosed examples instruct the sensor node to switch back to operating in the low power wireless mode, thereby providing for autonomous updating of the sensor node via the UAV.

The following is a non-exclusive list of examples disclosed herein. Other examples may be included above. In addition, any of the examples disclosed herein can be considered in whole or in part, and/or modified in other ways.

Example 1 includes an unmanned aerial vehicle including an update deliverer to access a firmware update to be delivered to a sensor node in a network, the sensor node coupled to an object; a camera to generate image data; and an identifier to identify the object based on the image data, the update deliverer to deliver the firmware update to the sensor node based on identification of the object.

Example 2 includes the unmanned aerial vehicle as defined in example 1, wherein the identifier is to further identify the object based on an identifier associated with the object, the identifier to detect the identifier in the image data.

Example 3 includes the unmanned aerial vehicle as defined in examples 1 or 2, further including a sensor node connection manager to instruct the sensor node to switch from a first wireless mode to a second wireless mode, the second wireless mode associated with a higher frequency band than the first wireless mode.

Example 4 includes the unmanned aerial vehicle as defined in example 3, wherein the update deliverer is to deliver the firmware update when the sensor node is in the second wireless mode.

Example 5 includes the unmanned aerial vehicle as defined in example 4, wherein the sensor node connection manager is to instruct the sensor node to switch from the second wireless mode to the first wireless mode when the firmware update is complete.

Example 6 includes the unmanned aerial vehicle as defined in example 3, further including a first radio frequency module and a second radio frequency module different from the first frequency module, the second radio module to transmit in a higher frequency band than the first radio frequency module, the sensor node connection manager send an instruction via the first radio frequency module to instruct the sensor node to switch to the second wireless mode.

Example 7 includes the unmanned aerial vehicle as defined in example 6, wherein the update deliverer is to deliver the firmware update via the second radio frequency module.

Example 8 includes the unmanned aerial vehicle as defined in example 1, further including an update monitor to generate a status message for the firmware update.

Example 9 includes the unmanned aerial vehicle as defined in example 8, further including a communicator to transmit the status message to a user device.

Example 10 includes the unmanned aerial vehicle as defined in example 1, further including a camera manager to activate the camera to generate the image data.

Example 11 includes the unmanned aerial vehicle as defined in any of examples 1, 2, 8, or 10, further including a navigator to instruct the unmanned aerial vehicle to fly to the object based on a map.

Example 12 includes the unmanned aerial vehicle of example 11, wherein the navigator is to generate position data, the identifier to further identify the object based on the position data.

Example 13 includes at least one non-transitory computer readable storage medium including instructions that, when executed, cause a machine to access a firmware update to be delivered to a sensor node in a network, the sensor node coupled to an object, generate image data, identify the object based on the image data, and deliver the firmware update to the sensor node based on identification of the object.

Example 14 includes the at least one non-transitory computer readable storage medium as defined in example 13, wherein the object includes an identifier and wherein the instructions further cause the machine to detect the identifier in the image data and identify the object based on the identifier.

Example 15 includes the at least one non-transitory computer readable storage medium as defined in examples 13 or 14, wherein the instructions further cause the machine to instruct the sensor node to switch from a first wireless mode to a second wireless mode, the second wireless mode associated with a higher frequency band than the first wireless mode.

Example 16 includes the at least one non-transitory computer readable storage medium as defined in example 15, wherein the instructions further cause the machine to deliver the firmware update when the sensor node is in the second wireless mode.

Example 17 includes the at least one non-transitory computer readable storage medium as defined in example 16, wherein the instructions further cause the machine to instruct the sensor node to switch from the second wireless mode to the first wireless mode when the firmware update is complete.

Example 18 includes the at least one non-transitory computer readable storage medium as defined in example 15, wherein the instructions cause the machine to send an instruction via a first radio frequency module to instruct the sensor node to switch to the second wireless mode.

Example 19 includes the at least one non-transitory computer readable storage medium as defined in example 18, wherein the instructions cause the machine to deliver the firmware update via a second radio frequency module, the second radio module to transmit in a higher frequency band than the first radio frequency module.

Example 20 includes a method including accessing a firmware update to be delivered to a sensor node in a network, the sensor node coupled to an object, generating image data, identifying the object based on the image data, and delivering the firmware update to the sensor node based on identification of the object.

Example 21 includes the method as defined in example 20, wherein the object includes an identifier and further including detecting the identifier in the image data and identifying the object based on the identifier.

Example 22 includes the method as defined in examples 20 or 21, further including instructing the sensor node to switch from a first wireless mode to a second wireless mode, the second wireless mode associated with a higher frequency band than the first wireless mode.

Example 23 includes the method as defined in example 22, further including delivering the firmware update when the sensor node is in the second wireless mode.

Example 24 includes the method as defined in example 23, further including instructing the sensor node to switch from the second wireless mode to the first wireless mode when the firmware update is complete.

Example 25 includes the method as defined in example 22, further including sending an instruction via a first radio frequency module to instruct the sensor node to switch to the second wireless mode.

Example 26 includes the method as defined in example 25, further including delivering the firmware update via a second radio frequency module, the second radio frequency module to transmit in a higher frequency band than the first radio frequency module.

Example 27 includes a system including an unmanned aerial vehicle manager to generate an instruction for an unmanned aerial vehicle to deliver a firmware update to a sensor node in a sensor node network and a sensor node update manager. The sensor node update manager is to, in response to the instruction from the unmanned aerial vehicle manager navigate the unmanned aerial vehicle to a location proximate to the sensor node, transmit a message to the sensor node to switch from a first wireless mode to a second wireless mode, and deliver the firmware update when the sensor node is operating in the second wireless node.

Example 28 includes the system as defined in example 27, wherein the unmanned aerial vehicle manager is to be implemented by a processor of a user device.

Example 29 includes the system as defined in example 27, wherein the sensor node update manager is to transmit the message to the sensor node when the sensor node is operating in the first wireless mode.

Example 30 includes the system as defined in example 27, wherein the sensor node update manager is to identify an object including the sensor node based on image data and an identifier associated with the object.

Example 31 includes the system as defined in example 27, wherein the unmanned aerial vehicle manager is to generate a map, the sensor node update manager to navigate the unmanned aerial vehicle based on the map.

Example 32 includes an apparatus including means for navigating an unmanned aerial vehicle to a sensor node in a sensor node network, means for instructing the sensor node to switch from a first wireless mode to a second wireless mode, and means for delivering a firmware update to the sensor node via the unmanned aerial vehicle when sensor node is in the second wireless mode.

Example 33 includes the apparatus as defined in example 32, further including means for identifying an object including the sensor node, the means for instructing the sensor node to instruct the sensor node based on identification of the object.

Example 34 includes the apparatus as defined in example 33, further including means for generating image data, the means for identifying the object to identify the object based on the image data.

Example 35 includes the apparatus as defined in example 32, wherein the means for instructing the sensor node is to instruct the sensor node to switch from the second wireless mode to the first wireless mode after the means for delivering the firmware update delivers the firmware update.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An unmanned aerial vehicle comprising:
   a navigator to generate position data during flight of the unmanned aerial vehicle;
   a camera;
   a camera manager to:
      determine a distance of the unmanned aerial vehicle from an object to be provided with updated firmware based on the position data;

perform a comparison of the distance to a distance threshold; and in response to the distance being within the distance threshold, instruct the camera to generate image data;

an object identifier to identify the object based on the image data;

a sensor node connection manager to instruct the object to switch from a first wireless communication mode to a second wireless communication mode in response to identification of the object, the second wireless communication mode employing a higher data transmission speed than the first wireless communication mode; and an update deliverer to deliver a firmware update to the object using the second wireless communication mode.

2. The unmanned aerial vehicle as defined in claim 1, wherein the object identifier is to identify the object based on an identifier associated with the object, the object identifier to detect the identifier in the image data.

3. The unmanned aerial vehicle as defined in claim 1, wherein the second wireless communication mode is associated with a higher frequency band than the first wireless communication mode.

4. The unmanned aerial vehicle as defined in claim 1, wherein the sensor node connection manager is to instruct the object to switch from the second wireless communication mode to the first wireless communication mode when the firmware update is complete.

5. The unmanned aerial vehicle as defined in claim 3, further including first radio frequency circuitry and second radio frequency circuitry different from the first radio frequency circuitry, the second radio frequency circuitry to transmit in the higher frequency band, the first radio frequency circuitry to transmit in a lower frequency band, the sensor node connection manager to send an instruction via the first radio frequency circuitry to instruct the object to switch to the second wireless communication mode.

6. The unmanned aerial vehicle as defined in claim 5, wherein the update deliverer is to deliver the firmware update via the second radio frequency circuitry.

7. The unmanned aerial vehicle as defined in claim 1, wherein the image data includes depth data and the navigator is to determine a hover position of the unmanned aerial vehicle relative to the object based on the depth data.

8. At least one non-transitory computer readable storage medium comprising instructions that, when executed, cause an unmanned aerial vehicle to at least:

generate position data during flight;

determine a position of the unmanned aerial vehicle relative to an object to be provided with updated firmware based on the position data;

perform a comparison of the position of the unmanned aerial vehicle to a distance threshold;

in response to the position of the unmanned aerial vehicle being within a distance represented by the distance threshold of the object, instruct a camera of the unmanned aerial vehicle to generate image data;

identify the object based on the image data;

instruct the object to switch from a first wireless communication mode to a second wireless communication mode in response to identification of the object, the second wireless communication mode employing a higher data transmission speed than the first wireless communication mode; and deliver a firmware update to the object via the second wireless communication mode.

9. The at least one non-transitory computer readable storage medium as defined in claim 8, wherein the object includes an identifier and the instructions cause the unmanned aerial vehicle to detect the identifier in the image data and identify the object based on the identifier.

10. The at least one non-transitory computer readable storage medium as defined in claim 8, wherein the second wireless communication mode is associated with a higher frequency band than the first wireless communication mode.

11. The at least one non-transitory computer readable storage medium as defined in claim 8, wherein the instructions cause the unmanned aerial vehicle to instruct the object to switch from the second wireless communication mode to the first wireless communication mode when the firmware update is complete.

12. The at least one non-transitory computer readable storage medium as defined in claim 10, wherein the instructions cause the unmanned aerial vehicle to send an instruction via first radio frequency circuitry to instruct the object to switch to the second wireless communication mode.

13. The at least one non-transitory computer readable storage medium as defined in claim 12, wherein the instructions cause the unmanned aerial vehicle to deliver the firmware update via second radio frequency circuitry, the second radio frequency circuitry to transmit in the higher frequency band than the first radio frequency circuitry.

14. A method comprising:

generating position data during flight of an unmanned aerial vehicle;

determining a distance from the unmanned aerial vehicle to an object to be provided with updated firmware based on the position data;

performing a comparison of the distance to a distance threshold;

in response to the distance being within the distance threshold of the object, causing a camera of the unmanned aerial vehicle to generate image data;

identifying, by executing an instruction with a processor, the object based on the image data;

instructing the object to switch from a first wireless communication mode to a second wireless communication mode in response to identification of the object, the second wireless communication mode employing a higher data transmission speed than the first wireless communication mode; and delivering a firmware update to the object using the second wireless communication mode.

15. The method as defined in claim 14, wherein the object includes an identifier and further including detecting the identifier in the image data, the identifying of the object based on the identifier.

16. The method as defined in claim 14, wherein the second wireless communication mode is associated with a higher frequency band than the first wireless communication mode.

17. The method as defined in claim 14, further including instructing the object to switch from the second wireless communication mode to the first wireless communication mode when the firmware update is complete.

18. The method as defined in claim 16, further including sending an instruction via first radio frequency circuitry to instruct the object to switch to the second wireless communication mode.

* * * * *